United States Patent
Eckel et al.

(10) Patent No.: US 9,162,416 B1
(45) Date of Patent: Oct. 20, 2015

(54) BASAL PLANE REINFORCED MICROLATTICE

(71) Applicant: HRL Laboratories, LLC, Malibu, CA (US)

(72) Inventors: Zak C. Eckel, Calabasas, CA (US); Tobias A. Schaedler, Oak Park, CA (US); William Carter, Calabasas, CA (US); Sophia S. Yang, Los Angeles, CA (US); Kevin J. Maloney, Malibu, CA (US); Alan J. Jacobsen, Woodland Hills, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 14/462,501

(22) Filed: Aug. 18, 2014

(51) Int. Cl.
*E04B 1/18* (2006.01)
*B32B 3/12* (2006.01)
*C25D 7/00* (2006.01)
*G02B 6/12* (2006.01)
*G02B 6/122* (2006.01)

(52) U.S. Cl.
CPC ... *B32B 3/12* (2013.01); *C25D 7/00* (2013.01); *G02B 6/12002* (2013.01); *G02B 6/1221* (2013.01); *G02B 2006/1219* (2013.01); *G02B 2006/12173* (2013.01)

(58) Field of Classification Search
CPC .... B32B 3/12; G02B 6/1221; G02B 6/12002; G02B 2006/12173; G02B 2006/1219; C25D 7/00
USPC .................................. 52/633; 428/304.4, 594
See application file for complete search history.

(56) References Cited

U.S. PATENT DOCUMENTS

| | | | | |
|---|---|---|---|---|
| 4,671,841 | A * | 6/1987 | Stephens | 156/292 |
| 8,745,958 | B2 * | 6/2014 | Kang et al. | 52/745.19 |
| 2010/0300669 | A1 * | 12/2010 | Jacobsen et al. | 165/185 |
| 2013/0303067 | A1 * | 11/2013 | Doty et al. | 454/76 |
| 2014/0037873 | A1 * | 2/2014 | Cheung et al. | 428/34.1 |
| 2014/0251585 | A1 * | 9/2014 | Kusuda et al. | 165/164 |
| 2014/0272277 | A1 * | 9/2014 | Schaedler et al. | 428/116 |
| 2014/0288650 | A1 * | 9/2014 | Hunt | 623/16.11 |

* cited by examiner

*Primary Examiner* — Mark Wendell
(74) *Attorney, Agent, or Firm* — Christie, Parker & Hale, LLP

(57) ABSTRACT

A three-dimensional microlattice structure includes a series of interconnected struts extending along at least three different directions, a series of intermediate nodes defined at intersections between the struts, and a basal plane structure extending laterally between and interconnecting at least two of the nodes. The basal plane structure may be configured to transversely and rotationally constrain the nodes to increase the overall compressive strength and stiffness of the microlattice structure. In one embodiment, the interconnected struts are arranged into an array of ordered unit cells.

24 Claims, 24 Drawing Sheets

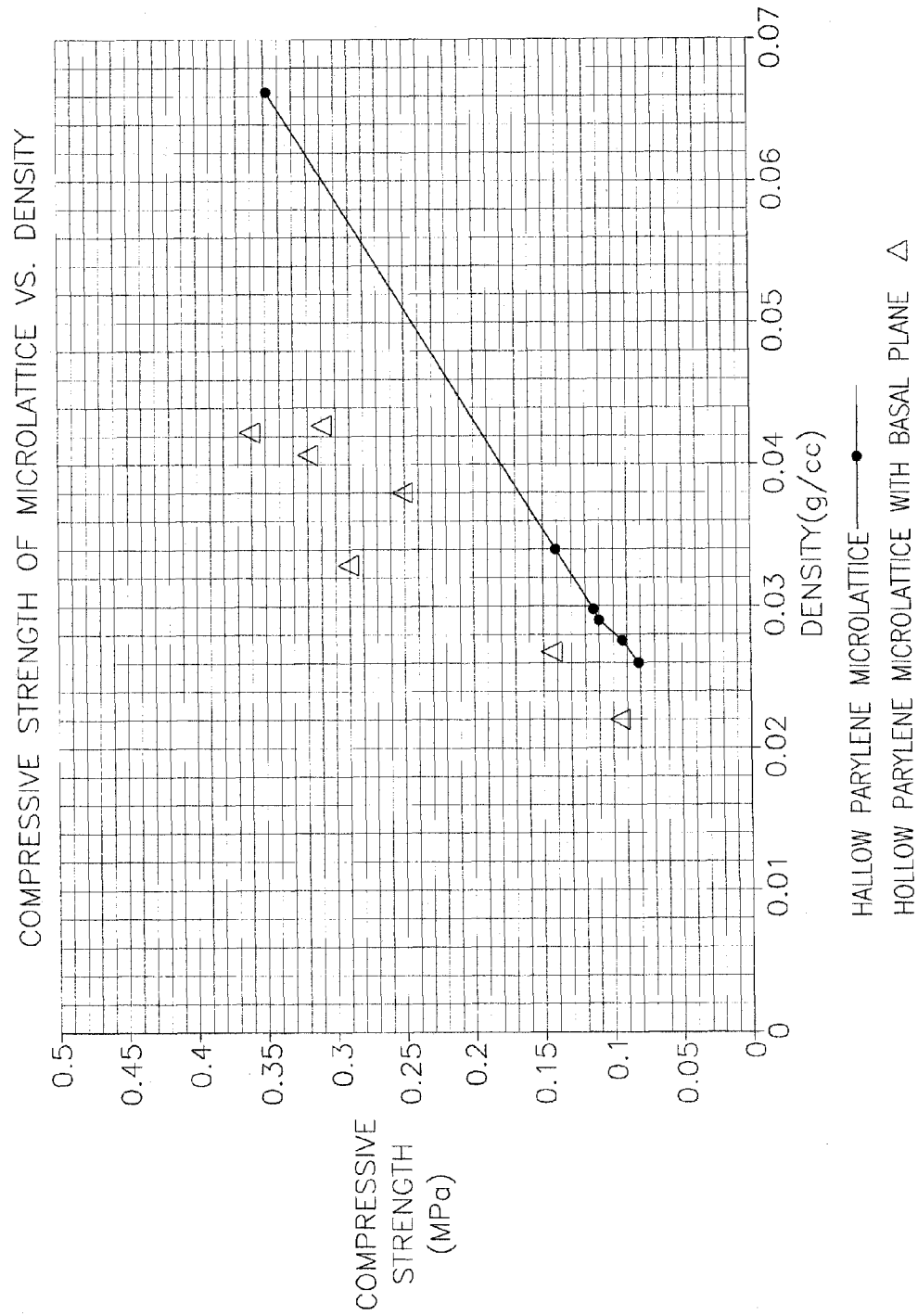

BASAL PLANE REINFORCED MICROLATTICE

FIELD

The present invention relates generally to microlattice structures and, more particularly, to microlattice structures reinforced by a basal plane structure.

BACKGROUND

Structural components, such as those incorporated into aerospace or automotive vehicles, are commonly sandwich structures that have a pair of thin and rigid facesheet materials separated by a lightweight reinforcing core. The reinforcing core may include closed-cell materials, such as honeycomb, or open-cell materials, such as a microlattice structure. Conventional microlattice structures include a series of interconnected lattice members or struts arranged in periodic arrays, such as arrays of octahedral or hexahedral unit cells. Additionally, conventional microlattice structures also include a series of nodes formed at the intersections and points of convergence between the lattice struts.

The nodes of the struts are typically the weak points of the microlattice structure because stresses transmitted through the lattice struts are concentrated at the relatively small nodes (e.g., the stresses transmitted through several lattice struts are concentrated at a single node). Accordingly, mechanical failure at these nodes is likely to occur if the microlattice structure is subject to compressive loading exceeding a particular threshold. Thus, the overall compressive strength and stiffness of conventional microlattice structures, and the structural components into which the microlattice structures are incorporated, are limited by the failure point of the nodes.

SUMMARY

The present disclosure is directed to various embodiments of a three-dimensional microlattice structure having a basal plane structure. In one embodiment, the three-dimensional microlattice structure includes a series of interconnected struts extending along at least three different directions, a series of nodes defined at intersections between the struts, and a basal plane structure extending between and interconnecting at least two of the nodes. The basal plane structure may have any suitable configuration, such as a flat, solid plate, a flat plate defining a series of apertures, a flat plate having a series of collars, a series of interconnected basal plane members arranged in a grid-like pattern, a mesh, or a series of individual basal plane members. The struts may have any suitable configuration, such as solid tubes or hollow tubes. The struts may be made out of any suitable material, such as polymer optical waveguides. The interconnected struts may be arranged into an array of ordered unit cells. The basal plane structure may have a non-uniform thickness. The basal plane structure may be made out of any suitable material, such as metals, metal alloys, composites, fiberglass, ceramics, natural fibers, ceramic fiber cloths, natural fiber cloths, polymeric cloths, metallic cloths, rubbers, plastics, or any combination thereof. The spacing between adjacent nodes may vary across the three-dimensional microlattice structure. The three-dimensional microlattice structure may also include a second basal plane structure coupled to an upper end or a lower end of the interconnected struts.

The present disclosure is also directed to various methods for manufacturing a three-dimensional microlattice structure having a basal plane structure. In one embodiment, the method includes supporting a basal plane structure at a desired height within in a volume of liquid photo-monomer and irradiating the volume of photo-monomer with a series of collimated light beams to form the three-dimensional microlattice having a series of interconnected polymer optical waveguides. The desired height of the basal plane structure may be approximately or about one-half of a total height of the microlattice. The basal plane structure may have any suitable configuration, such as a flat, solid plate, a flat plate defining a series of apertures, a flat plate having a series of collars, a series of interconnected basal plane members arranged in a grid-like pattern, a mesh, or a series of individual basal plane members. The basal plane structure may be made out of a material translucent to wavelengths of the collimated light beams and irradiating the volume of photo-monomer may include directing a series of the collimated light beams through the basal plane structure such that the polymer optical waveguides form on opposite sides of the basal plane structure. The basal plane structure may include a flat plate defining a series of apertures and irradiating the volume of photo-monomer may include directing a series of the collimated light beams through the apertures in the basal plane structure. The basal plane structure may be made out of any suitable material, such as metals, metal alloys, composites, fiberglass, ceramics, natural fibers, ceramic fiber cloths, natural fiber cloths, polymeric cloths, metallic cloths, rubbers, plastics, or any combination thereof. The method may also include coating the polymer optical waveguides with a dissimilar material by any suitable process, such as electrodeposition, electroplating, vapor deposition, spray coating, dip coating, or any combination thereof. The method may further include selectively removing the polymer optical waveguides to form a series of interconnected hollow tubular struts.

According to another embodiment of the present disclosure, a method of manufacturing a three-dimensional microlattice includes positioning a substrate against an upper surface of a volume of photo-monomer contained in a reservoir, irradiating the volume of photo-monomer with a first series of collimated light beams to form a first layer of the three-dimensional microlattice having a first series of interconnected polymer optical waveguides adhered to the substrate, actuating a moveable platform coupled to the substrate to lift the first layer of the three-dimensional microlattice out of a remaining volume of photo-monomer, coupling a basal plane structure to a lower end of the first layer of the three-dimensional microlattice, and irradiating the remaining volume of photo-monomer with a second series of collimated light beams to form a second layer of the three-dimensional microlattice having a second series of interconnected waveguides adhered to the basal plane structure. The method may also include adding or removing a volume of photo-monomer to the reservoir after irradiating the volume of photo-monomer with a series of collimated light beams to form the first layer of the three-dimensional microlattice. The method may include orienting the second series of collimated light beams such that the orientation of the second series of collimated light beams differs from the orientation of the first series of collimated light beams. The method may also include directing the first series of collimated light beams through a series of apertures defined by a first mask, replacing the first mask with a second mask defining a series of apertures differing in at least one of size, shape, and spacing from the apertures defined by the first mask, and directing the second series of collimated light beams through the series of apertures defined by the second mask such that the struts in the first and second layers of the microlattice structure differ in at least one of size, cross-sectional shape, and spacing. The method may also include coating the first and second series of polymer optical waveguides with a dissimilar material by any suitable process, such as electrodeposition, electroplating, vapor deposition, spray coating, dip coating, or any combination thereof. The method may also include selectively removing the first and second series of polymer optical waveguides to form a series of interconnected hollow tubular struts.

This summary is provided to introduce a selection of concepts that are further described below in the detailed description. This summary is not intended to identify key or essential features of the claimed subject matter, nor is it intended to be used in limiting the scope of the claimed subject matter.

BRIEF DESCRIPTION OF THE DRAWINGS

These and other features and advantages of embodiments of the present disclosure will become more apparent by reference to the following detailed description when considered in conjunction with the following drawings. In the drawings, like reference numerals are used throughout the figures to reference like features and components. The figures are not necessarily drawn to scale.

FIG. 2 is a graph comparing the compressive strength of one embodiment of a microlattice structure with a basal plane structure against a microlattice structure without a basal plane structure;

DETAILED DESCRIPTION

The present disclosure is directed to various embodiments of a microlattice structure having a plurality of interconnected struts and a basal plane structure. The basal plane structure may be configured to increase the compressive strength and stiffness of the microlattice structure. In one or more embodiments, the basal plane structure transversely and rotationally constrains a plurality of nodes of the microlattice structure and thereby increases the overall compressive strength and stiffness of the microlattice structure. The basal plane structures of the present disclosure may have any suitable features or characteristics depending on the intended function of the basal plane structures, such as, for instance, as a reinforcing structure, a conductive structure (e.g., as an anode or cathode in a battery or a fuel cell), and/or as a fluid permeable (e.g., porous) structure (e.g., as a filter). The microlattice structures of the present disclosure may be incorporated into any desired structure, such as, for instance, military or commercial aircraft (e.g., paneling, bulkheads, airfoils, wings, blades), impact and crash protection components on vehicles (e.g., automotive crush rails or crush cans, automotive steering columns, automotive A- or B-pillars), or vibration and acoustic damping components on a vehicle or other structure. The present disclosure is also directed to various methods of manufacturing a microlattice structure having a basal plane structure. In one embodiment, the basal plane structure may be coupled to the struts concurrently or simultaneously with the formation of the struts.

Figure 1A:
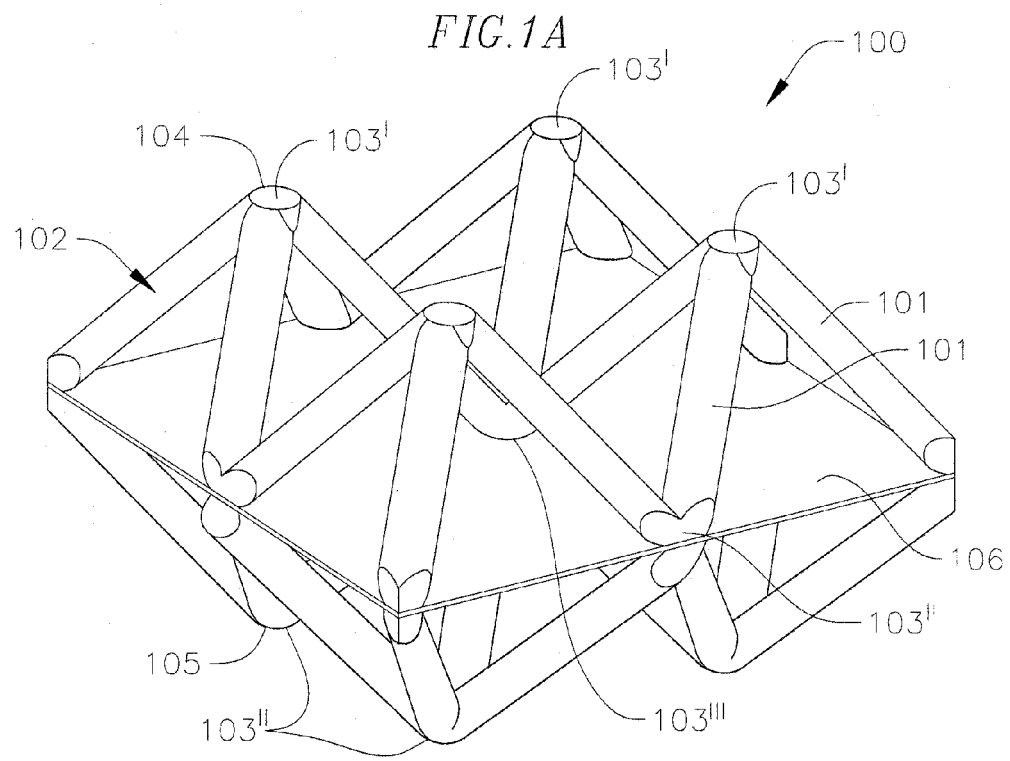
FIG. 1A is a perspective view of a microlattice structure having a basal plane structure according to one embodiment of the present disclosure.
Figure 1B:
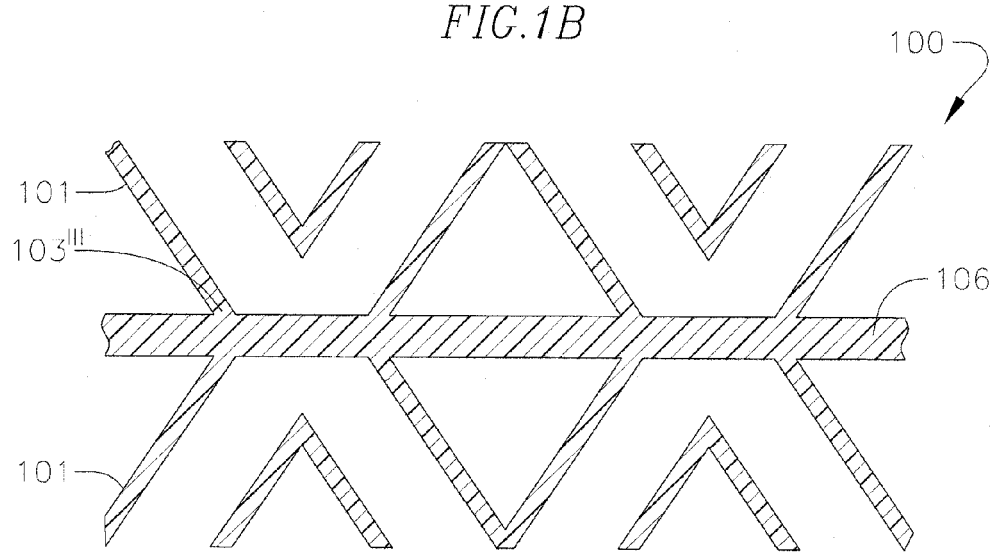
FIG. 1B is a cross-section view of the microlattice structure of FIG. 1A.

With reference now to FIGS. 1A and 1B, a microlattice structure 100 according to one embodiment of the present disclosure includes a plurality of interconnected struts 101. In the illustrated embodiment, the struts 101 are oriented in an array of octahedral unit cells 102. In one or more alternate embodiments, the struts 101 may be arranged and oriented into any other suitable shapes, such as, for instance, hexahedral unit cells. Additionally, although the microlattice structure 100 in the illustrated embodiment includes four octahedral unit cells 102, in one or more alternate embodiments, the microlattice structure 100 may have any other suitable number of unit cells 102 depending on the intended application of the microlattice structure 100. Additionally, in the illustrated embodiment, a plurality of nodes 103 are defined at the intersections between the struts 101 (i.e., nodes 103 are formed at the points of convergence of the struts 101). In the illustrated embodiment, the microlattice structure 100 includes a set of upper nodes 103' along an upper end 104 of the microlattice structure 100, a set of lower nodes 103" along a lower end 105 of the microlattice structure 100, and a set of center nodes 103'" disposed between the sets of upper and lower nodes 103', 103". The struts 101 of the microlattice structure 100 may be made out of any suitable material, such as, for instance, polymer, metal, metal alloy, ceramic, or any combination thereof. Additionally, in the illustrated embodiment, the struts 101 are hollow tubes, although in one or more alternate embodiments, the struts 101 may be solid rods. Additionally, the struts 101 may have any desired cross-sectional shape, such as, for instance, circular, oval, or polygonal (e.g., triangular, pentagonal, hexagonal, star-shaped), depending on the intended application and desired strength and stiffness of the microlattice structure 100.

With continued reference to FIGS. 1A and 1B, the microlattice structure 100 also includes a basal plane structure 106 extending on a basal plane and interconnecting the center nodes 103'" of the struts 101 (i.e., the basal plane structure 106 extends parallel to a lateral or horizontal axis of the microlattice structure 100 and between the center nodes 103" of the struts 101). The engagement between the basal plane structure 106 and the center nodes 103'" is configured to transversely and rotationally constrain the center nodes 103'" of the microlattice structure 100 and thereby increase the overall compressive strength and stiffness of the microlattice structure 100 compared to an otherwise equivalent microlattice structure without a basal plane structure (e.g., the basal plane structure 106 is configured to eliminate or at least reduce the translational and rotational movement of the center nodes 103'" when the microlattice structure 100 is subject to a compressive load).

In the embodiment illustrated in FIGS. 1A and 1B, the basal plane structure 106 is a flat, solid plate, although the basal plane structure 106 may have any other suitable configuration depending on the intended application and desired compressive strength and stiffness of the microlattice structure 100. Alternate embodiments of the basal plane structure are described in detail below with reference to FIGS. 7A-18. Additionally, as described in U.S. Pat. No. 8,017,193, the entire content of which is incorporated herein by reference, the basal plane structure 106 may be made of any suitable material that is compatible with the chemistry of the struts 101. For instance, the basal plane structure made be made out of polymer materials (e.g., thermosets or thermoplastics), metal (e.g., aluminum or stainless steel), composites (e.g., carbon fiber, glass fiber reinforced polymer, fiberglass, or ceramic fibers), organic materials (e.g., wood, paper, or cardboard), ceramic cloth, natural cloth, polymeric cloth, metallic cloth, rubber, plastic, or any combination thereof. Additionally, in one embodiment, the basal plane structure 106 may be made out of the same or similar material as the struts 101, although in one or more alternate embodiments, the basal plane structure 106 may be made out of a different material than the struts 101. The basal plane structure 106 may be made by any suitable process, such as, for instance, extruding, machining, stamping, pressing, molding, welding, chemical etching, additive manufacturing (e.g., stereolithography), or any combination thereof.

As described above, a microlattice structure with a basal plane structure has a higher compressive strength and stiffness than an otherwise equivalent microlattice structure without a basal plane structure. FIG. 2 is a graph illustrating the compressive strength of one embodiment of a microlattice structure having a basal plane structure compared to an otherwise equivalent microlattice structure without a basal plane structure. Both of the tested microlattice structures comprised a plurality of interconnected hollow parylene struts, but the microlattice structure with the basal plane structure included a 1 mil (25.4 µm) thick stainless steel basal plane structure extending between and interconnecting the center nodes of the struts. The data depicted in FIG. 2 was obtained by applying increasing compressive loads to the microlattice structures until they reached failure. Additionally, the compressive strength data in FIG. 2 is plotted against the measured density of the hollow parylene struts. Accordingly, differences in the measured compressive strength due to the presence or absence of the basal plane structure can be distinguished from differences in compressive strength due to variations in the density of the hollow parylene struts.

As illustrated in FIG. 2, for a given density of the hollow parylene struts, the compressive strength of the microlattice structure with the basal plane structure exceeded the compressive strength of the microlattice structure without the basal plane structure. For instance, a tested microlattice structure without a basal plane structure having hollow parylene struts with a density of approximately or about 0.028 grams per cubic centimeter (g/cc) had a compressive strength of approximately or about 0.09 MPa, whereas a microlattice structure with a basal plane structure having hollow parylene struts with a density of approximately or about 0.027 g/cc had a compressive strength of approximately or about 0.14 MPa. Additionally, a tested microlattice structure without a basal plane structure having hollow parylene struts with a density of approximately or about 0.034 g/cc had a compressive strength of approximately or about 0.14 MPa, whereas a microlattice structure with a basal plane structure having hollow parylene struts with a density of approximately or about 0.033 g/cc had a compressive strength of approximately or about 0.29 MPa. Additionally, from the compressive strength data provided in FIG. 2, the tested microlattice structures without the basal plane structure had an average specific strength of approximately or about 3.5 MPa/(g/cc), whereas the tested microlattice structures with the basal plane structure had an average specific strength of approximately or about 6.5 MPa/(g/cc). Accordingly, the tested microlattice structures with the basal plane structure had an average specific strength approximately or about 86% higher than the tested microlattice structures without the basal plane structure.

Figure 3:
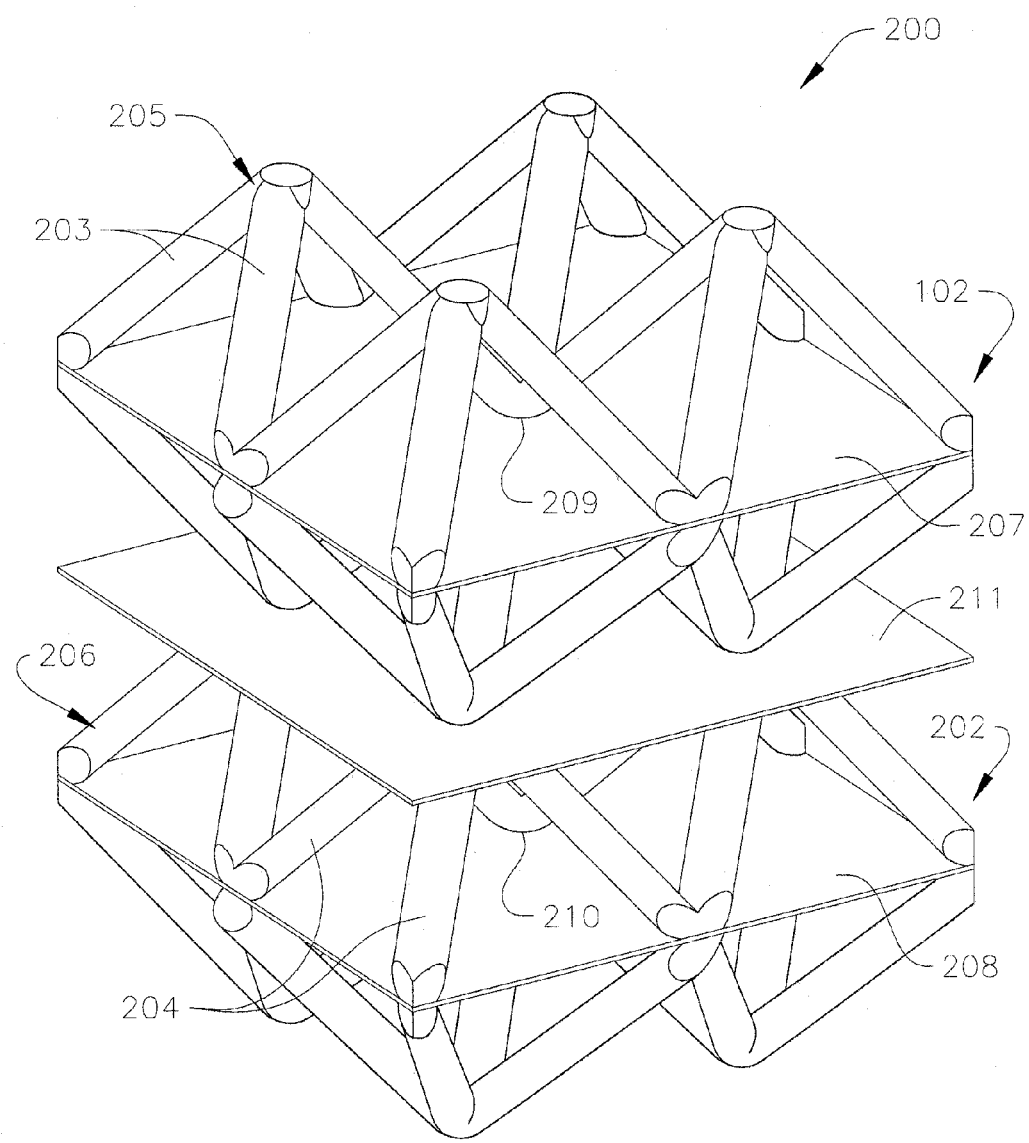
FIG. 3 is a perspective view of the microlattice structure of FIG. 1A in a stacked configuration.

With reference now to FIG. 3, a microlattice structure 200 according to another embodiment of the present disclosure includes two microlattice layers 201, 202 stacked on top of each other (i.e., the microlattice structure 200 includes an upper microlattice layer 201 stacked on top of a lower microlattice layer 202). In one embodiment, each of the upper and lower microlattice structure layers 201, 202 may be the same or similar to the microlattice structure 100 described above with reference to FIGS. 1A and 1B. In the illustrated embodiment, the upper and lower microlattice layers 201, 202 each include a plurality of interconnected struts 203, 204 arranged into an array of octahedral unit cells 205, 206 and a basal plane structure 207, 208 extending between center nodes 209, 210 of the struts 203, 204, respectively. Additionally, in one or more alternate embodiments, the microlattice structure 200 may include any other suitable number of microlattice structure layers 201, 202 depending on the intended application a desired compressive strength of the microlattice structure 200, such as, for instance, from three to ten layers.

With continued reference to the embodiment illustrated in FIG. 3, the microlattice structure 200 includes an intermediate basal plane structure 211 disposed between the upper and lower microlattice layers 201, 202 (i.e., the intermediate basal plane structure 211 separates the upper and lower microlattice layers 201, 202). Moreover, the intermediate basal plane structure 211 interconnects lower nodes 212 on the upper microlattice layer 201 and also interconnects upper nodes 213 on the lower microlattice layer 202. In the illustrated embodiment, the intermediate basal plane structure 211 is the same or similar to the basal plane structures 207, 208 on the upper and lower microlattice layers 201, 202 (e.g., the intermediate basal plane structure 211 is a flat, solid plate), although in one or more alternate embodiments, the configuration and/or material of the intermediate basal plane structure 211 may differ from the configuration and/or material of the basal plane structures 207, 208 of the upper and lower microlattice layers 201, 202.

Figure 4:
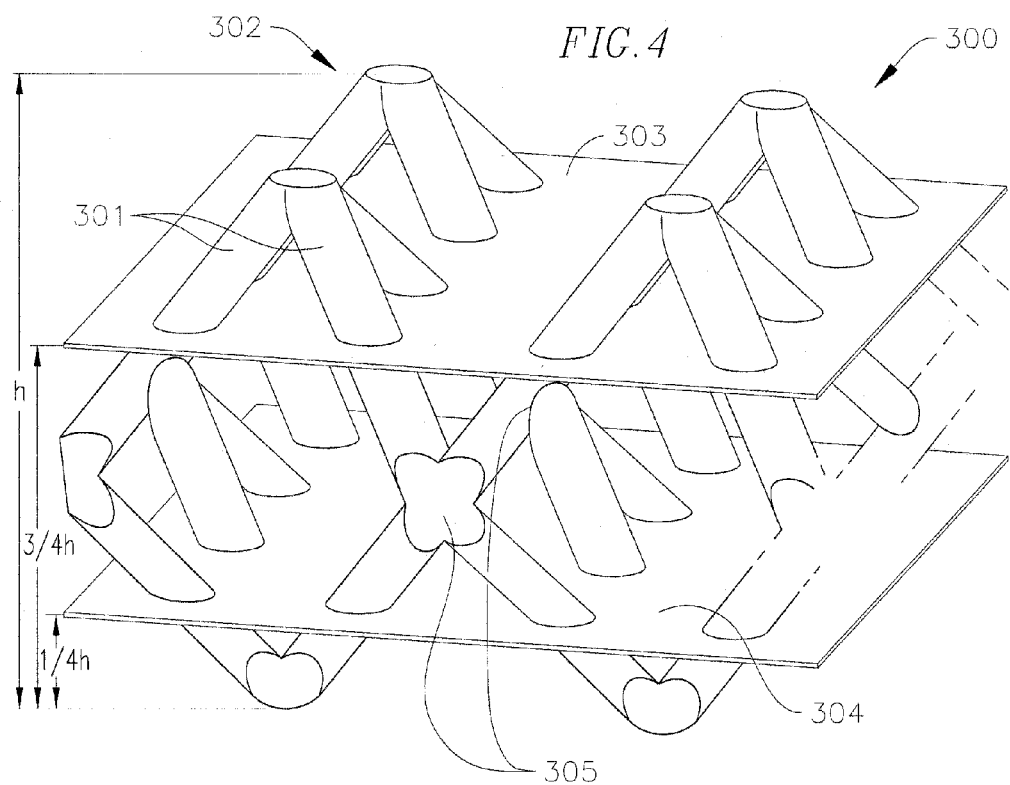
FIG. 4 is a perspective view of a microlattice structure having two basal plane structures according to another embodiment of the present disclosure.

With reference now to FIG. 4, a microlattice structure 300 according to another embodiment of the present disclosure includes a plurality of interconnected struts 301 oriented into an array of octahedral unit cells 302 and two basal plane structures 303, 304 on basal planes located at approximately or about one-quarter and approximately or about three-quarters of a total height h of the microlattice structure 300, respectively. The two basal plane structures 303, 304 located at approximately or about one-quarter and approximately or about three-quarters of the height h of the microlattice structure 300 interconnect portions of the struts 301, rather than a set of center nodes 305 of the struts 301, as in the embodiment of the microlattice structure 100 described above with reference to FIGS. 1A and 1B. Additionally, the basal plane structures 303, 304 may be provided instead of, or in addition to, a basal plane structure interconnecting the center nodes 305 of the struts 301. In one or more alternate embodiments, the basal plane structures 303, 304 may be provided at any other suitable positions along the height h of the microlattice structure 300. Additionally, in one or more alternate embodiments, the microlattice structure 300 may include any other suitable number of basal plane structures, such as, for instance, from one to four. In the illustrated embodiment, the basal plane structures 303, 304, are flat, solid plates, although in one or more alternate embodiments, the basal plane structures 303, 304 may have any other configuration suitable for the intended application and the desired performance characteristics of the microlattice structure 300. Alternate embodiments of the basal plane structure are described in detail below with reference to FIGS. 7A-18.

Figure 5:
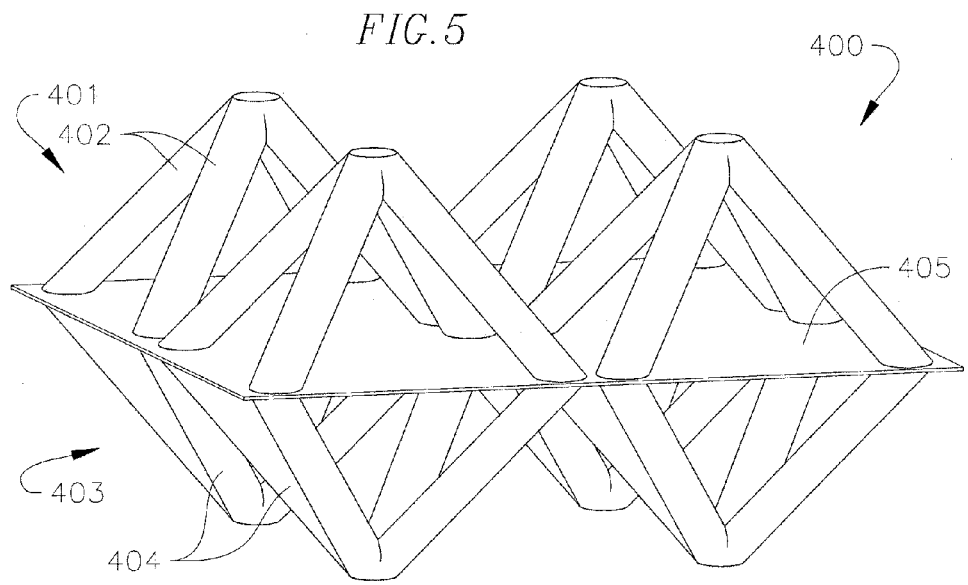
FIG. 5 is a perspective view of a microlattice structure having a basal plane structure according to another embodiment of the present disclosure.

With reference now to FIG. 5, a microlattice structure 400 according to another embodiment of the present disclosure includes an upper layer 401 having a plurality of interconnected struts 402 oriented and arranged in an array of square pyramidal shapes and a lower layer 403 having a plurality of interconnected struts 404 oriented and arranged in an array of square pyramidal shapes. Unlike the microlattice structure 100 described above with reference to FIGS. 1A and 1B, however, the microlattice structure 400 does not include a set of central nodes. Instead, the central nodes of the struts 402, 404 have been removed by any suitable process or were not formed during the process of manufacturing the microlattice structure 400. The microlattice structure 400 also includes a basal plane structure 405 having any desired configuration, such as, for instance, a flat, solid plate, disposed between the upper and lower layers 401, 403.

Figure 6A:
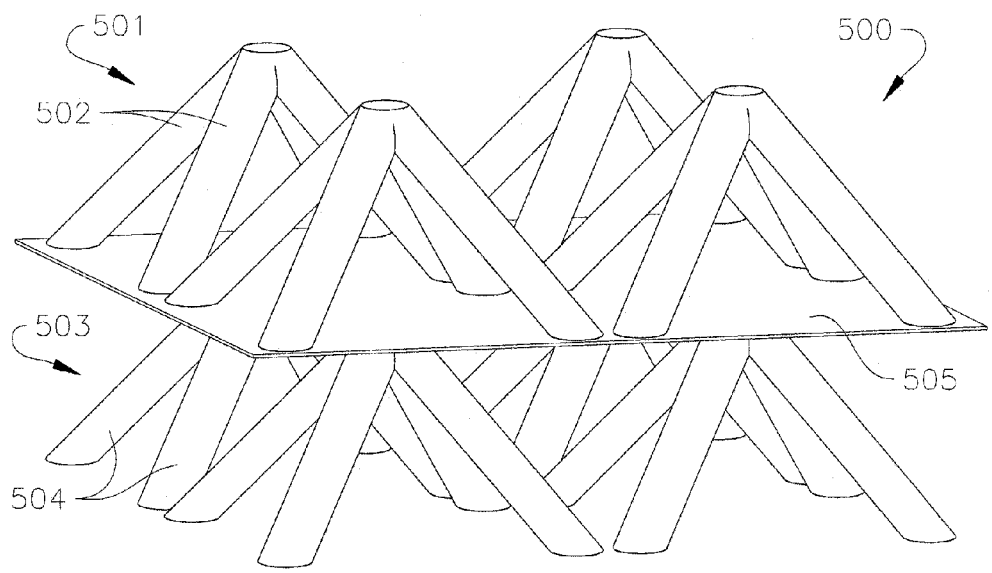
FIGS. 6A and 6B are a perspective view and a side view, respectively, of a microlattice structure having a basal plane structure according to a further embodiment of the present disclosure.
Figure 6B:
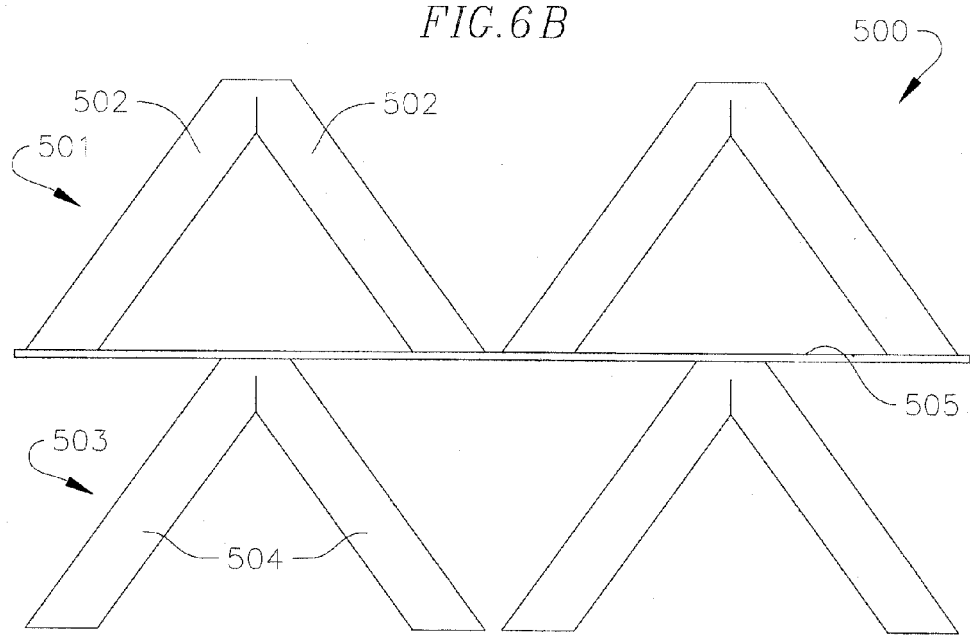

With reference now to FIGS. 6A and 6B, a microlattice structure 500 according to another embodiment of the present disclosure includes an upper layer 501 having a plurality of interconnected struts 502 oriented and arranged in an array of square pyramidal shapes stacked on top of a lower layer 503 having a plurality of interconnected struts 504 oriented and arranged in an array of square pyramidal shapes. In the illustrated embodiment, the upper and lower layers 501, 503 each define one-half of an array of unit cells. In the illustrated embodiment, the struts 502, 504 of the upper and lower layers 501, 503, respectively, have the same shape, size, orientation, and configuration, although in one or more alternate embodiments, the struts 502, 504 may have different shapes, sizes, orientations, and/or configurations. Additionally, although in the illustrated embodiment, the struts 502, 504 in the upper and lower layers 501, 503 are arranged in square pyramidal shapes, in one or more alternate embodiments, the struts 502, 504 in the upper and lower layers 501, 503 may be arranged into any other suitable shapes, such as, for instance, tetrahedral shapes, depending on the intended application and the desired performance characteristics of the microlattice structure 500. In the illustrated embodiment, the microlattice structure 500 also includes a basal plane structure 505 disposed between the upper and lower layers 501, 503 (i.e., the basal plane structure 505 separates the upper and lower layers 501, 503). The basal plane structure 505 may have any desired configuration, such as, for instance, a flat, solid plate.

Figure 7A:
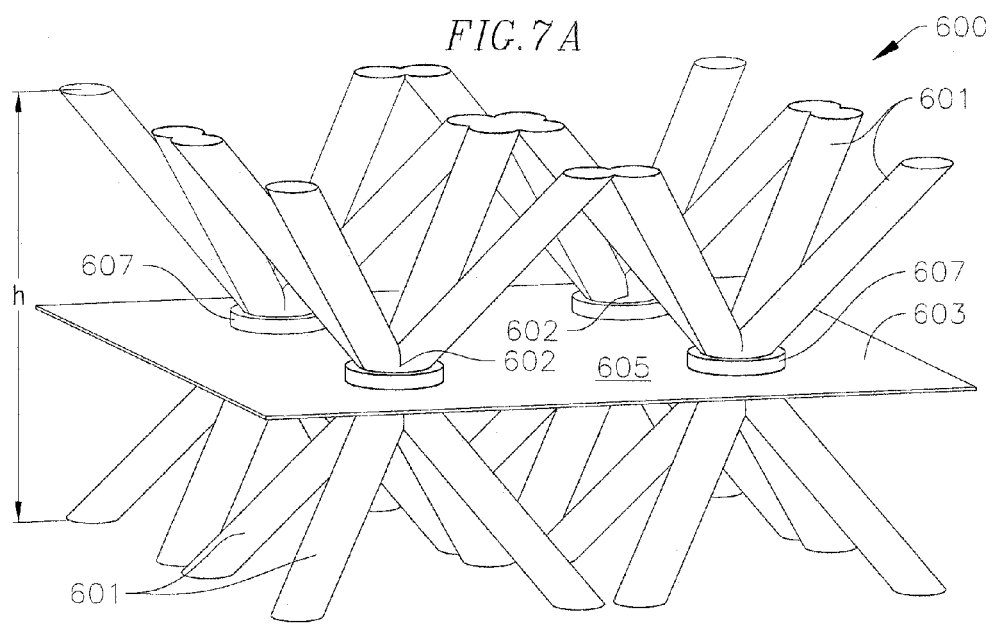
FIGS. 7A and 7B are a perspective view and a cross-sectional view, respectively, of a microlattice structure having a basal plane structure according to one embodiment of the present invention.
Figure 7B:
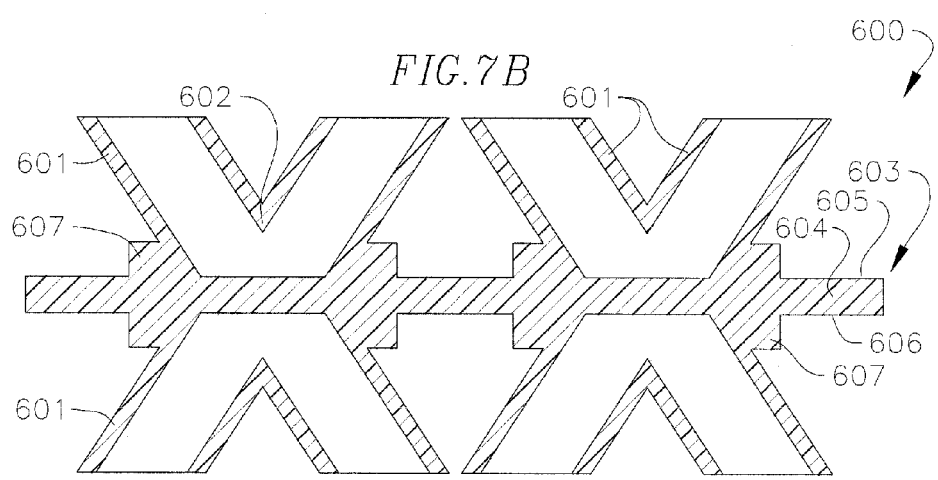
Figure 7C:
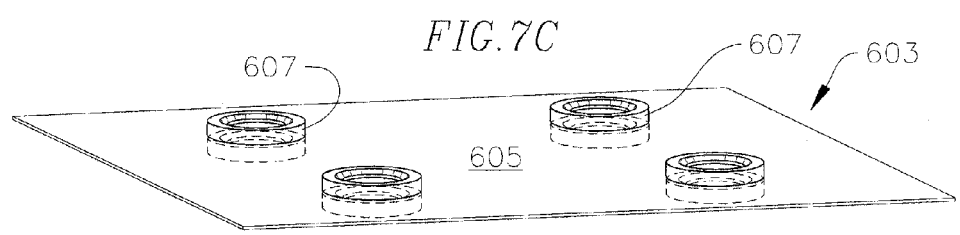
FIG. 7C is a perspective view of the basal plane structure of FIG. 7A having a plurality of collars.
Figure 8A:
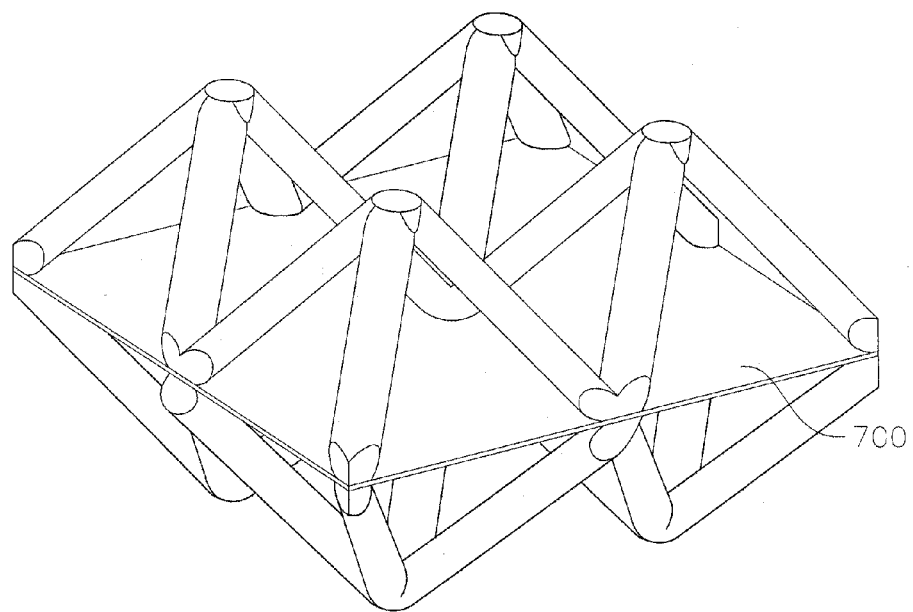
FIG. 8A is a perspective view of a microlattice structure having a basal plane structure according to another embodiment of the present invention.
Figure 8B:
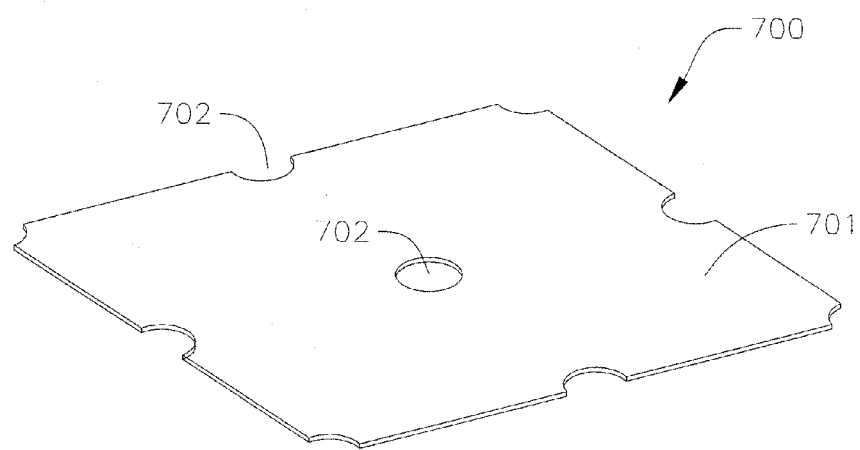
FIG. 8B is a top view of the basal plane structure of FIG. 8A having a plurality of apertures for receiving a plurality of nodes.

With reference now to FIGS. 7A-7C, a microlattice structure 600 according to another embodiment of the present disclosure includes a plurality of interconnected hollow tubular struts 601 oriented into an array of octahedral unit cells, although in one or more alternate embodiments, the struts 601 may be oriented into any other suitable shapes, such as, for instance, hexahedral unit cells. Additionally, in one or more alternate embodiments, the struts 601 may be solid rods. The struts 601 may also have any desired cross-sectional shape, such as, for instance, circular, oval, or polygonal (e.g., triangular, pentagonal, hexagonal, star-shaped), depending on the intended application and desired strength and stiffness of the microlattice structure 600. The microlattice structure 600 also includes a set of central nodes 602 where the struts 601 intersect.

With continued reference to the embodiment illustrated in FIGS. 7A-7C, the microlattice structure 600 also includes a basal plane structure 603 extending on a basal plane and through the central nodes 602 of the struts 601. In one or more alternate embodiments, the basal plane structure 603 may be located at any other position along the height h of the microlattice structure 600, such as, for instance, at approximately or about one-quarter or approximately or about three-quarters of the height h of the microlattice structure 600. In the illustrated embodiment, the basal plane structure 603 is a flat, solid plate 604 having an upper surface 605 and a lower surface 606 opposite the upper surface 605. The basal plane structure 603 also includes a plurality of collars 607 protruding upward from the upper surface 605 and protruding downward from the lower surface 606 of the flat, solid plate 604. In an alternate embodiment, the collars 607 may only extend either upward from the upper surface 605 or downward from the lower surface 606. Additionally, in the illustrated embodiment, the collars 607 are thin-walled annular members, although in one or more alternate embodiments, the collars 607 may have any other suitable shape depending on the cross-sectional shape of the struts 601 and the central nodes 602. In one embodiment, the shape of the collars 607 matches the cross-sectional shape of the central nodes 602, although in one or more alternate embodiments, the shape of the collars 607 may differ from the cross-sectional shape of the central nodes 602. The collars 607 on the basal plane structure 603 surround the central nodes 602 of the struts 601 and thereby transversely and rotationally constrain the central nodes 602 to increase the overall compressive strength and stiffness of the microlattice structure 600. In one or more alternate embodiments, the basal plane structure 603 may include one or more protrusions (e.g., ridges, gussets, ribs) on the upper surface 605 and/or lower surface 606 of the flat, solid plate 604 spaced apart from the central nodes 602 to increase the overall compressive strength and stiffness of the microlattice structure 600.

With reference now to FIGS. 8A-18, various alternate embodiments of the basal plane structure will now be described. In the embodiment illustrated in FIGS. 8A and 8B, basal plane structure 700 is a flat plate 701 defining a plurality of apertures 702. Depending on the height at which basal plane structure 700 is intended to be installed along a microlattice structure, the apertures 702 in the basal plane structure 700 may be configured either to receive a plurality of central nodes of the microlattice structure or a plurality of struts of the microlattice structure. The apertures 702 may have any desired shape, such as, for instance, circular, oval, or polygonal (e.g., triangular, pentagonal, hexagonal, or star-shaped). In one embodiment, the size and shape of the apertures 701 in the basal plane structure 700 substantially match the cross-sectional size and shape of the central nodes or the struts of the microlattice structure.

Figure 9A:
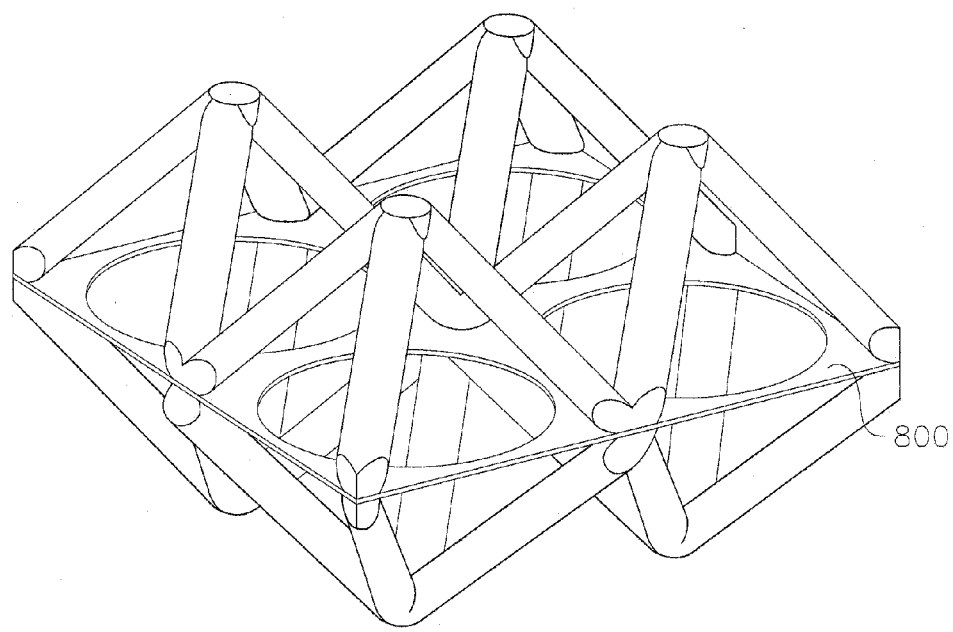
FIG. 9A is a perspective view of a microlattice structure having a basal plane structure according to another embodiment of the present invention.
Figure 9B:
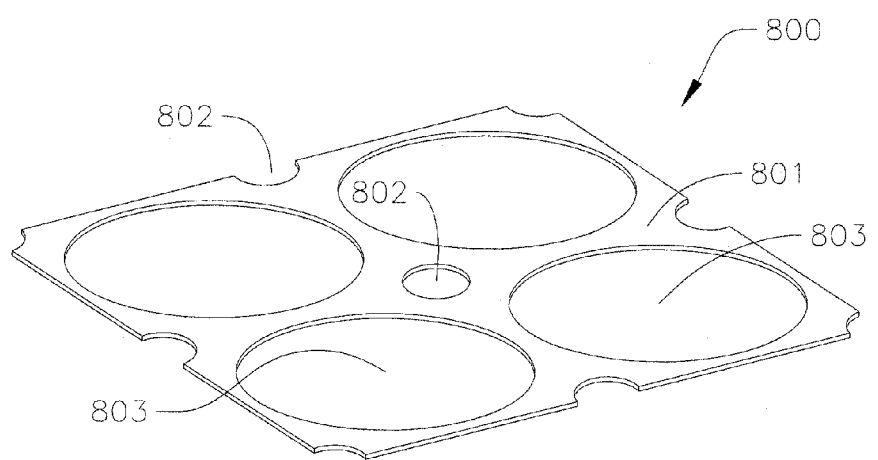
FIG. 9B is a top view of the basal plane structure of FIG. 9A having a plurality of apertures for receiving a plurality of nodes and a plurality of lightening holes.

With reference now to FIGS. 9A and 9B, a basal plane structure 800 according to another embodiment of the present disclosure includes a flat plate 801 defining a plurality of apertures 802 for receiving struts or nodes of a microlattice structure and a plurality of lightening apertures 803 (e.g., circular holes) configured to reduce the weight of the basal plane structure 800. The apertures 802 may have any suitable shape, such as, for instance, circular. In one embodiment, the size and shape of the apertures 802 in the basal plane structure 800 may substantially match the cross-sectional size and shape of the central nodes or the struts of the microlattice structure.

Figure 10A:
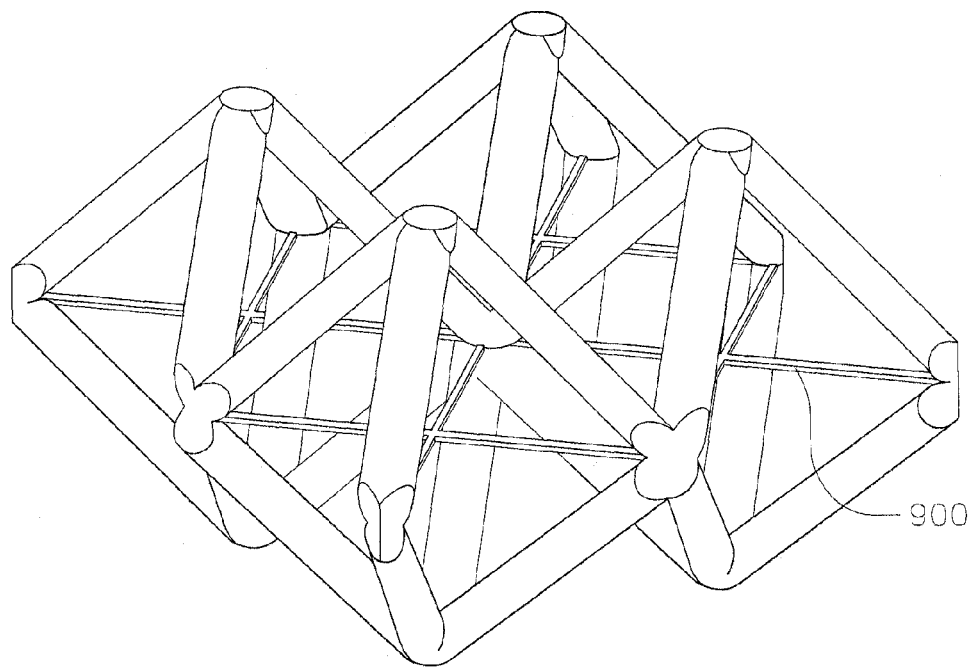
FIG. 10A is a perspective view of a microlattice structure having a basal plane structure according to another embodiment of the present invention.
Figure 10B:
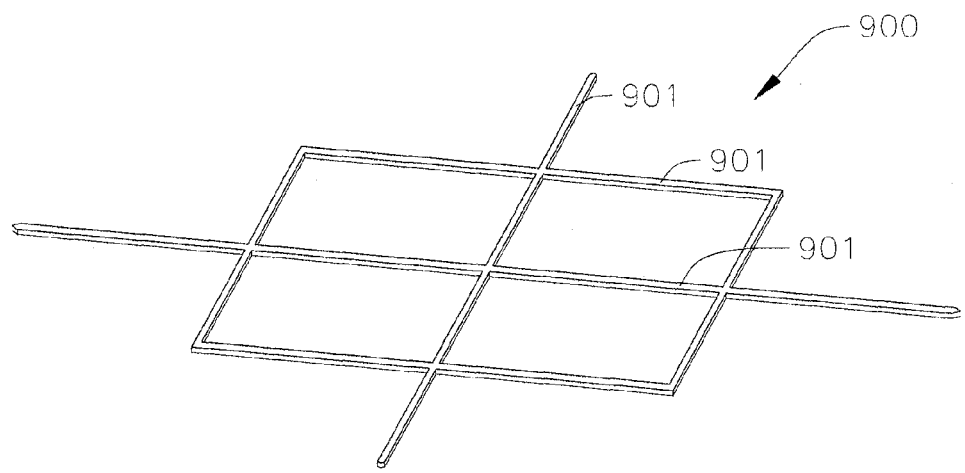
FIG. 10B is a top view of the basal plane structure of FIG. 10A having a plurality of interconnected diagonal members.

With reference now to FIGS. 10A and 10B, a basal plane structure 900 according to another embodiment of the present disclosure includes a plurality of interconnected diagonal members 901. The diagonal members 901 may have any suitable cross-sectional shape, such as, for instance, circular, square, rectangular, oval, or triangular. The diagonal members 901 are configured to interconnect a plurality of nodes or struts of a microlattice structure, as illustrated in FIG. 10A.

Figure 11A:
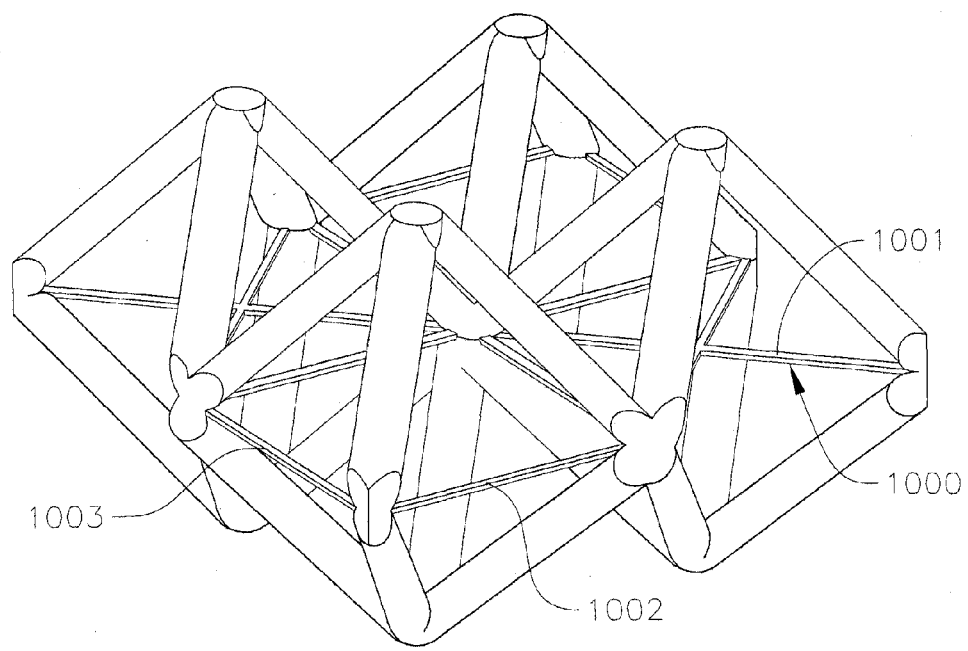
FIG. 11A is a perspective view of a microlattice structure having a basal plane structure according to another embodiment of the present invention.
Figure 11B:
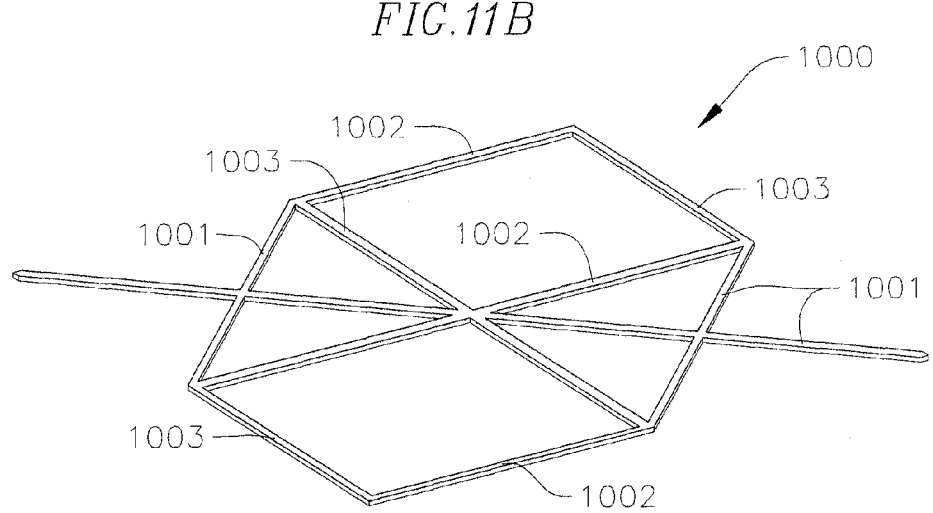
FIG. 11B is a top view of the basal plane structure of FIG. 11A having a plurality of interconnected diagonal, transverse, and longitudinal members.
Figure 12A:
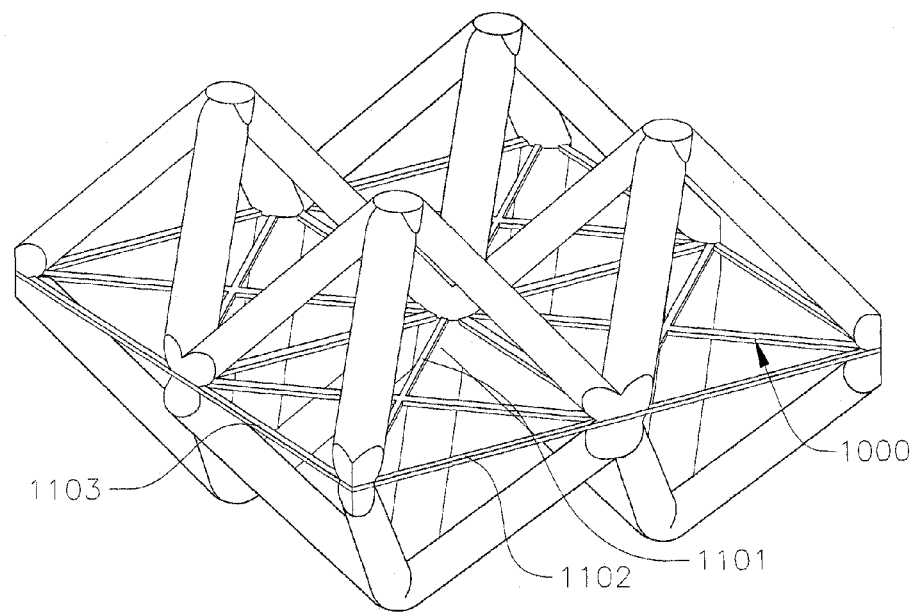
FIG. 12A is a perspective view of a microlattice structure having a basal plane structure according to another embodiment of the present invention.
Figure 12B:
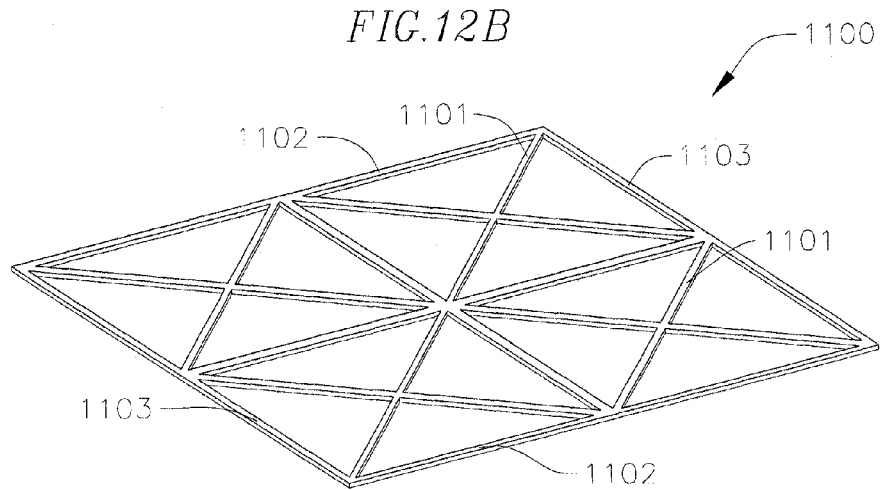
FIG. 12B is a top view of the basal plane structure of FIG. 12A having a plurality of interconnected diagonal, transverse, and longitudinal members.

With reference now to the embodiment illustrated in FIGS. 11A and 11B, basal plane structure 1000 includes a plurality of interconnected diagonal members 1001, transverse members 1002, and longitudinal members 1003. The diagonal, transverse, and longitudinal members 1001, 1002, 1003 may have any suitable cross-sectional shape, such as, for instance, circular, square, rectangular, oval, or triangular. The transverse members 1002 and longitudinal members 1003 are configured to interconnect a plurality of nodes or struts of a microlattice structure, as illustrated in FIG. 11A. Similarly, in the embodiment illustrated in FIGS. 12A and 12B, basal plane structure 1100 includes a plurality of interconnected diagonal members 1101, transverse members 1102, and longitudinal members 1103, which may have any suitable cross-sectional shape, such as, for instance, circular, square, rectangular, oval, or triangular.

Figure 13A:
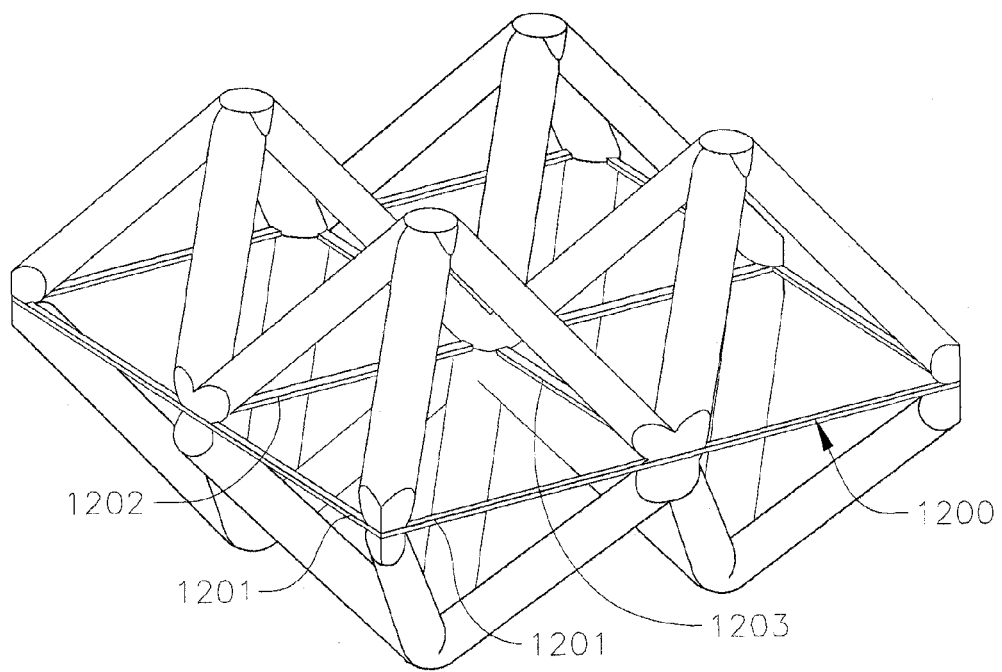
FIG. 13A is a perspective view of a microlattice structure having a basal plane structure according to another embodiment of the present invention.
Figure 13B:
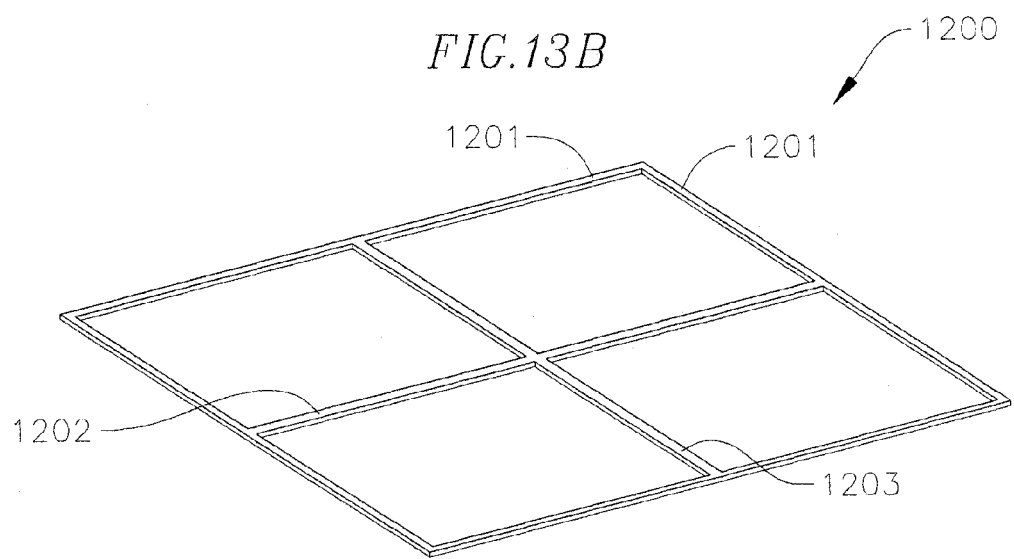
FIG. 13B is a top view of the basal plane structure of FIG. 13A having a window frame structure.
Figure 14A:
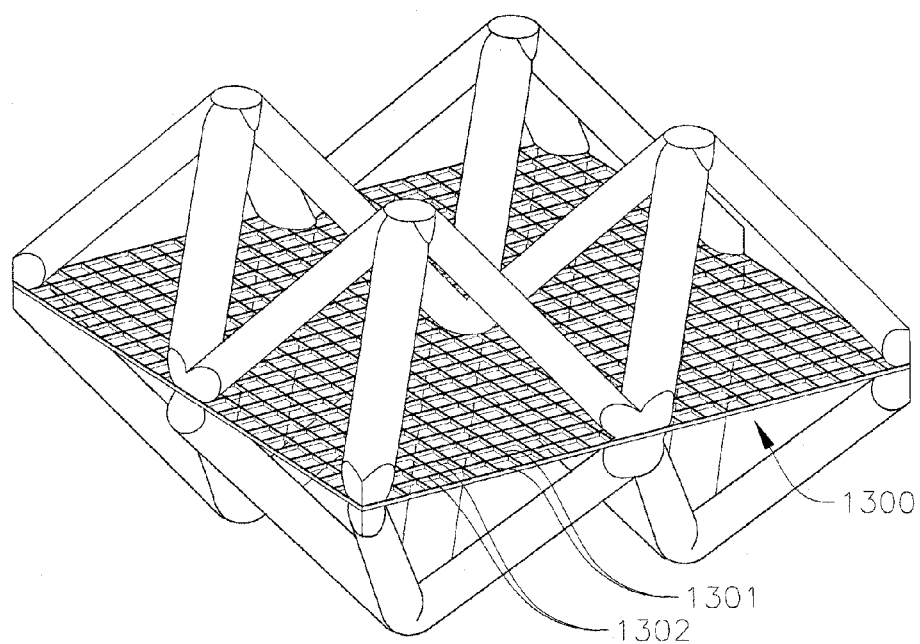
FIG. 14A is a perspective view of a microlattice structure having a basal plane structure according to another embodiment of the present invention.
Figure 14B:
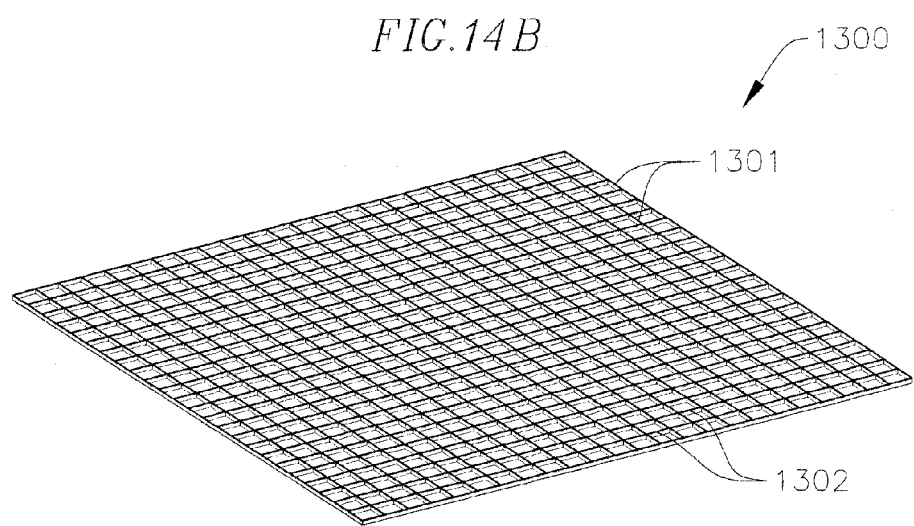
FIG. 14B is a top view of the basal plane structure of FIG. 14A having a mesh structure.

With reference now to FIGS. 13A and 13B, a basal plane structure 1200 according to another embodiment of the present disclosure is a window frame structure including a square border or frame 1201, a transverse member 1202 extending between opposite sides of the frame 1201, and a longitudinal member 1203 extending between opposite ends of the frame 1201. Although in the illustrated embodiment the basal plane structure 1200 includes a single transverse member 1202 and a single longitudinal member 1203, in one or more alternate embodiments, the basal plane structure 1200 may have any other suitable number of transverse and longitudinal members 1202, 1203, respectively, such as, for instance, from two to ten. The frame 1201, the transverse member 1202, and the longitudinal member 1203 may have any suitable cross-sectional shape, such as, for instance, circular, square, rectangular, oval, or triangular. The frame 1201, the transverse member 1202, and the longitudinal member 1203 are configured to interconnect a plurality of nodes or struts of a microlattice structure, as illustrated in FIG. 13A, In the embodiment illustrated in FIGS. 14A and 14B, basal plane structure 1300 is a mesh structure having a plurality of longitudinal members 1301 interconnected to a plurality of transverse members 1302. As illustrated in FIG. 14A, the spacing between adjacent longitudinal members 1301 and adjacent transverse members 1302 is less than the spacing between the nodes of the microlattice structure. Accordingly, in the embodiment illustrated in FIG. 14A, some of the longitudinal and transverse members 1301, 1302 do not extend between and interconnect the nodes or the struts of the microlattice structure.

Figure 15A:
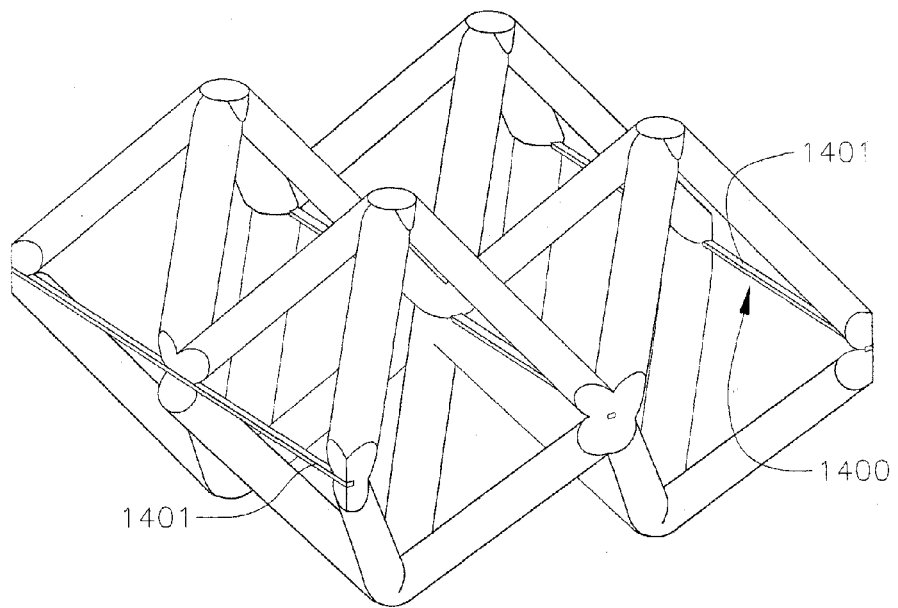
FIG. 15A is a perspective view of a microlattice structure having a basal plane structure according to another embodiment of the present invention.
Figure 15B:
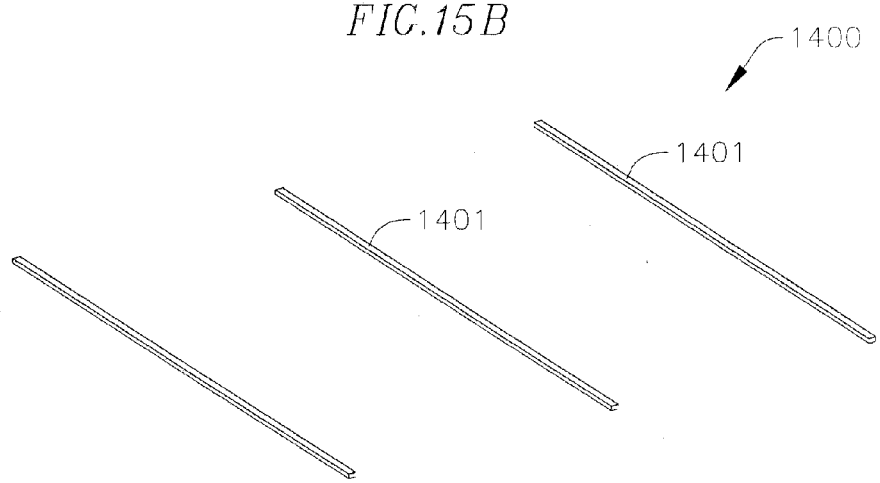
FIG. 15B is a top view of the basal plane structure of FIG. 15A having a plurality of separate transverse members.

With reference now to the embodiment illustrated in FIGS. 15A and 15B, basal plane structure 1400 includes a plurality of separate longitudinal members 1401 configured to connect the nodes or struts of a microlattice structure. The separate longitudinal members 1401 may have any suitable cross-sectional shape, such as, for instance, circular, square, rectangular, oval, or triangular. Although in the illustrated embodiment, the basal plane structure 1400 includes three separate longitudinal members 1401, in one or more alternate embodiments, the basal plane structure 1400 may include any other suitable number of longitudinal members 1401, such as, for instance, from one to ten, depending upon the size of the microlattice structure and the desired strength and stiffness of the microlattice structure. Similarly, in the embodiment illustrated in FIGS. 16A and 16B, basal plane structure 1500 includes a plurality of separate longitudinal members 1501 interconnecting the nodes or struts of a microlattice structure.

Additionally, in one or more embodiments of the present disclosure, the basal plane structure may be non-uniform (e.g., the spacing, size, orientation, and/or shape of the features of the basal plane structure may vary across the basal plane structure). The non-uniformity of the basal plane structure may be tailored based upon the intended application of the microlattice structure and the anticipated compressive loads on the microlattice structure, such as asymmetric or non-uniform compressive loads on the microlattice structure.

Figure 17:
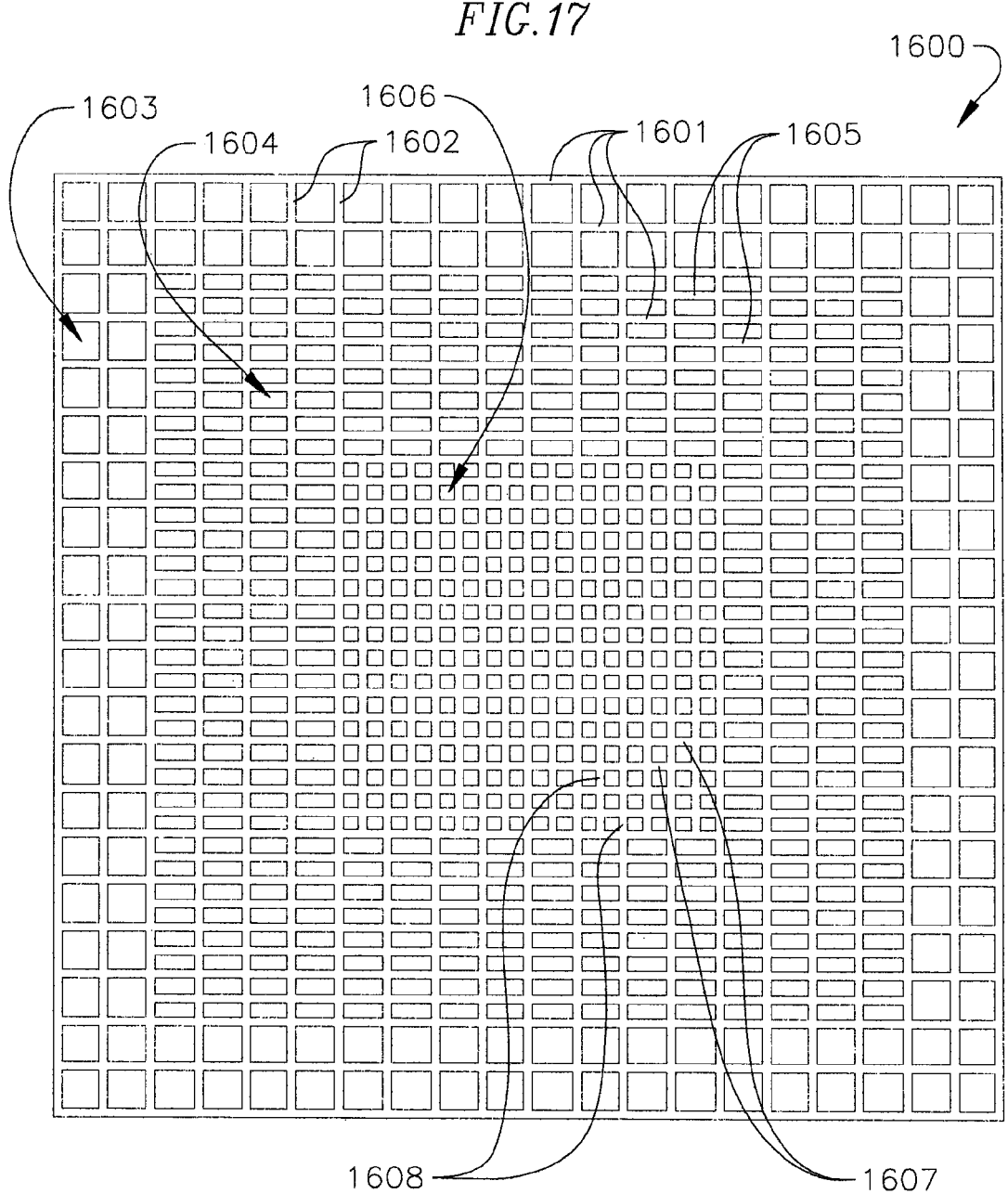
FIG. 17 is a top view of a basal plane structure having a plurality of interconnected members with varying spacing between the members according to one embodiment of the present disclosure.

For instance, in the embodiment illustrated in FIG. 17, basal plane structure 1600 includes a plurality of longitudinal members 1601 interconnected to a plurality of transverse members 1602 arranged into a grid-like pattern. In the illustrated embodiment, the cross-sectional shape of the longitudinal and transverse members 1601, 1602 is square, although in one or more alternate embodiments, the longitudinal and transverse members 1601, 1602 may have any other suitable cross-sectional shape, such as, for instance, circular, rectangular, oval, or triangular. In an outer peripheral region 1603 of the basal plane structure 1600, adjacent longitudinal and transverse members 1601, 1602 are spaced apart by a first distance. In an intermediate region 1604 of the basal plane structure, secondary longitudinal members 1605 are interposed between the longitudinal members 1601 such that the spacing between adjacent longitudinal members 1601, 1605 in the intermediate region 1604 is less than the first distance between the adjacent longitudinal members 1601 in the outer peripheral region 1603. In an inner region 1606 of the basal plane structure 1600, secondary longitudinal members 1607 and secondary transverse members 1608 are interposed between the longitudinal members 1601 and the transverse members 1602, respectively, such that the spacing between adjacent transverse members 1602, 1608 in the inner region 1606 is less than the spacing between adjacent transverse members 1602 in the intermediate and outer peripheral regions 1604, 1603. Accordingly, the basal plane structure 1600 in the embodiment illustrated in FIG. 17 includes outer, intermediate, and inner regions 1603, 1604, 1606 having progressively smaller spacing between the adjacent members. Although in the illustrated embodiment, the basal plane structure 1600 includes three regions 1603, 1604, 1606 having different spacing between adjacent members, in one or more embodiments, the basal plane structure 1600 may have any other suitable number of regions, such as, for instance, from two to ten regions, depending on the intended application and the desired performance characteristics of the basal plane structure 1600. Additionally, the regions 1603, 1604, 1606 of the basal plane structure 1600 may have any other suitable relative spacing between adjacent members. For instance, in one embodiment, the spacing between adjacent members may be closest in the outer peripheral region 1603, farther apart in the intermediate region 1604, and farthest apart in the inner region 1603.

Figure 18:
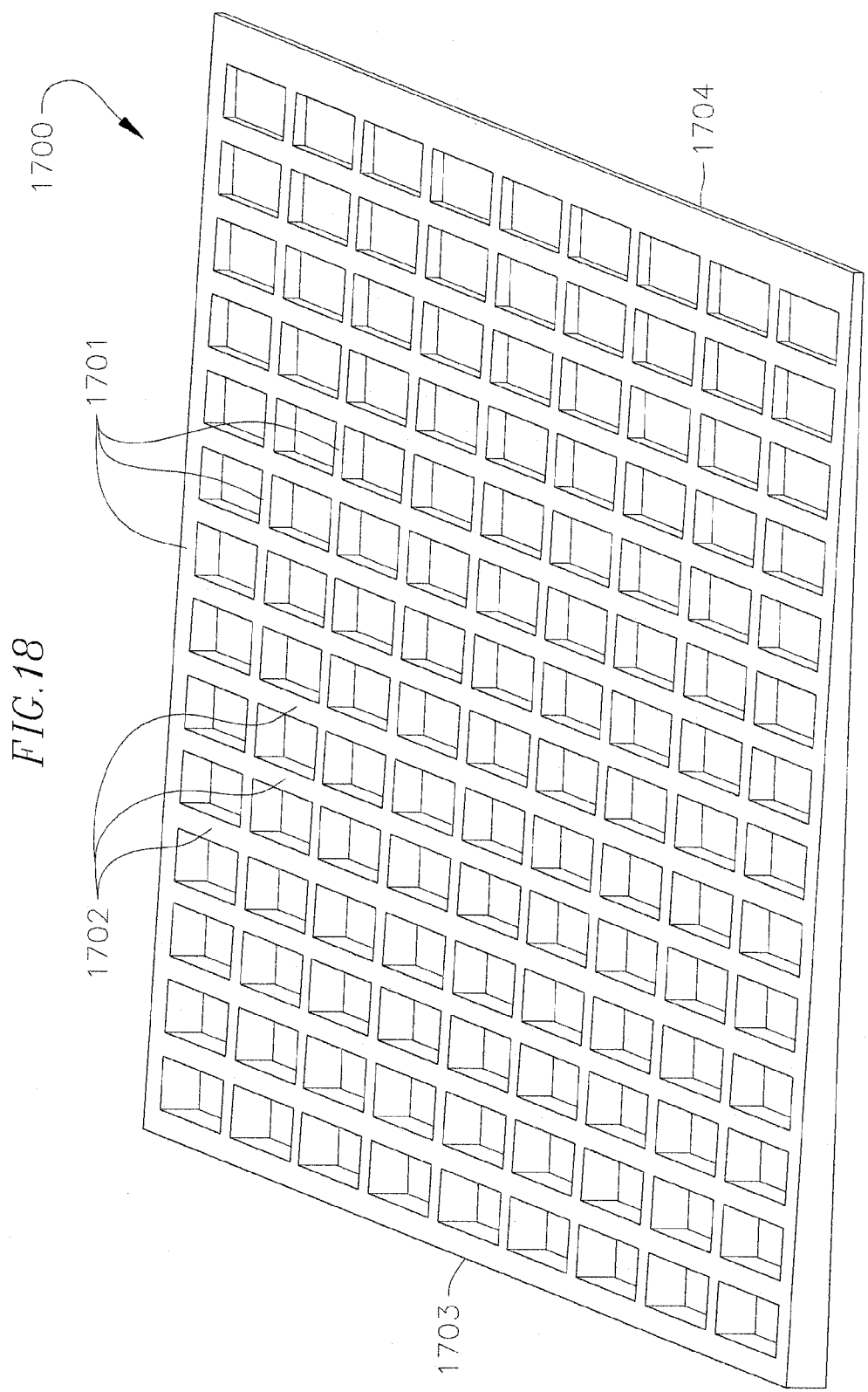
FIG. 18 is a perspective view of a basal plane structure having a plurality of interconnected transverse and longitudinal members and a tapered thickness according to one embodiment of the present disclosure.

With reference now to the embodiment illustrated in FIG. 18, a basal plane structure 1700 includes a plurality of longitudinal members 1701 interconnected to a plurality of transverse members 1702 arranged in a grid-like pattern. In the illustrated embodiment, the cross-sectional shape of the longitudinal and transverse members 1701, 1702 is square, although in one or more alternate embodiments, the longitudinal and transverse members 1701, 1702 may have any other suitable cross-sectional shape, such as, for instance, circular, rectangular, oval, or triangular. Additionally, in the illustrated embodiment, the basal plane structure 1700 is rectangular, although in one or more alternate embodiments, the basal plane structure 1700 may have any other suitable shape, such as, for instance, circular, depending upon the intended application of the microlattice structure into which the basal plane structure 1700 is incorporated. Additionally, in the illustrated embodiment, the basal plane structure 1700 tapers in the longitudinal direction between a relatively thicker first end 1703 and a relatively thinner second end 1704 opposite the thicker first end 1703. Accordingly, the transverse members 1702 are progressively thinner between the first end 1703 and the second end 1704 of the basal plane structure 1700 and the longitudinal members 1701 each taper between the thicker first end 1703 and the thinner second end 1704. In one or more alternate embodiments, the thickness of the basal plane structure 1700 may taper in the transverse direction instead of, or in addition to, the longitudinal direction.

Additionally, in one or more embodiments, the struts of the microlattice structure may be non-uniform (e.g., the spacing, size, orientation, and/or cross-section shape of the struts may vary across the microlattice structure). The non-uniformity of the microlattice structure may be tailored based upon the intended application of the microlattice structure and the anticipated compressive loads on the microlattice structure, such as, for instance, asymmetric or non-uniform compressive loads on the microlattice structure. For instance, in the embodiment illustrated in FIG. 19, a microlattice structure 1800 includes a plurality of interconnected struts 1801 oriented and arranged into an array of octahedral unit cells, although in one or more alternate embodiments, the struts 1801 may be oriented and arranged into any other suitable shapes, such as, for instance, hexahedral unit cells. Additionally, in the illustrated embodiment, the spacing between adjacent central nodes 1802 of the struts 1801 decreases from a first end 1803 to a second end 1804 of the microlattice structure 1800. In the illustrated embodiment, the first end 1803 is thicker than the second end 1804 of the microlattice structure 1800. The microlattice structure 1800 tapers between the relatively thicker first end 1803 and a relatively thinner second end 1804. Furthermore, in the illustrated embodiment, the cross-sectional sizes of the struts 1801 are progressively smaller between the first and second ends 1803, 1804 of the microlattice structure 1800. In one or more alternate embodiments, the thickness of the microlattice structure 1800, the spacing between the central nodes 1802, and/or the cross-sectional size of the struts 1801 may vary in any other manner across the microlattice structure 1800, such as, for instance, non-linearly across the microlattice structure 1800, depending on the desired performance characteristics of the microlattice structure 1800 and the anticipated compressive loads on the microlattice structure 1800.

Figure 20A:
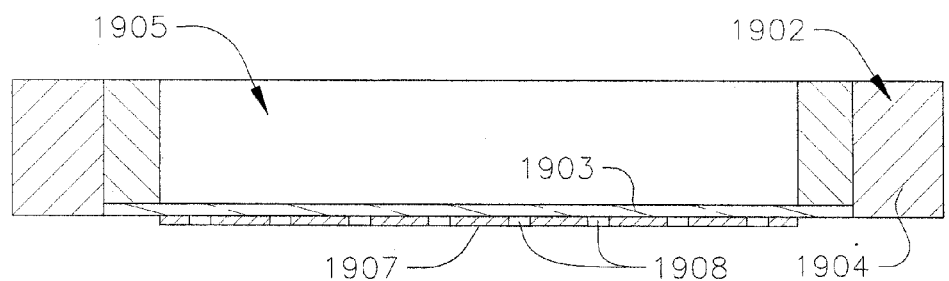
FIG. 20A illustrates a task of covering one end of a mold with a mask according to one embodiment of the present disclosure.

With reference now to FIGS. 20A-20D, a method of manufacturing a microlattice structure 1900 having at least one basal plane structure 1901 will now be described. As illustrated in FIG. 20A, the method includes a task of obtaining or providing a mold 1902 having a translucent base 1903 and vertical wall or rim 1904 extending upward from a periphery of the base 1903. Together, the base 1903 and the rim 1904 of the mold 1902 define a chamber or reservoir 1905. The base 1903 of the mold 1902 is translucent to those wavelengths of light that are configured to polymerize a liquid photo-monomer 1906 deposited into the reservoir 1905 during a subsequent task described below. With continued reference to the embodiment illustrated in FIG. 20A, the method also includes a task of covering the translucent base 1903 of the reservoir 1905 with a mask 1907. The mask 1907 defines a plurality of apertures 1908. The mask 1907 may define any desired number of apertures 1908 and the apertures 1908 may have any desired size, shape, and spacing, depending upon the desired characteristics of the microlattice structure 1900, as described below in more detail. Additionally, the mask 1907 may be made of any suitable material, such as, for instance, biaxially-oriented polyethylene terephthalate.

Figure 20B:
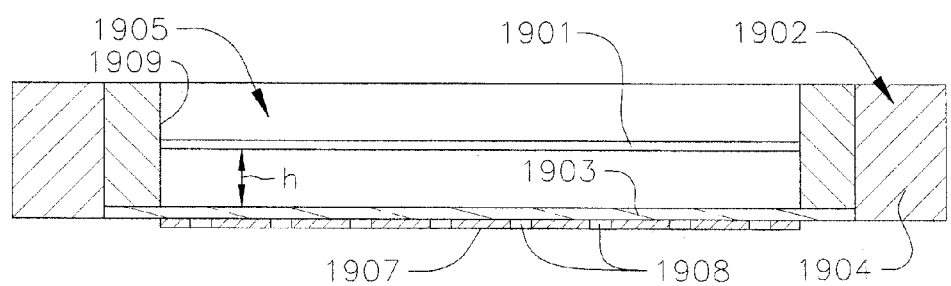
FIG. 20B illustrates a task of supporting a basal plane structure at a desired height within a reservoir defined by the mold according to one embodiment of the present disclosure.

With reference now to the embodiment illustrated in FIG. 20B, the method includes a task of inserting the basal plane structure 1901 supported by a support structure 1909 into the reservoir 1905 of the mold 1902. The support structure 1909 is configured to support the basal plane structure 1901 at a desired height h such that the basal plane structure 1901 has the desired height within the microlattice structure 1900 formed during subsequent tasks. In one embodiment, the support structure 1909 may be selected such that the height h of the basal plane structure 1901 in the reservoir 1905 will correspond to the height of nodes of the microlattice structure 1900. In another embodiment, the support structure 1909 may be selected such that the height of the basal plane structure 1901 in the reservoir 1905 will correspond a portion of the microlattice structure 1900 between the nodes, such as, for instance, approximately or about one-quarter or approximately or about three-quarters of the total height of the microlattice structure 1900, as illustrated in FIG. 4. In one or more alternate embodiments, the basal plane structure 1901 may not be supported on the support structure 1909, and the characteristics of the basal plane structure 1901 (e.g., material, configuration, density, and/or size) may be selected such that the basal plane structure 1901 is buoyant at the desired height h within the liquid photo-monomer 1906 in the reservoir 1905.

Figure 21:
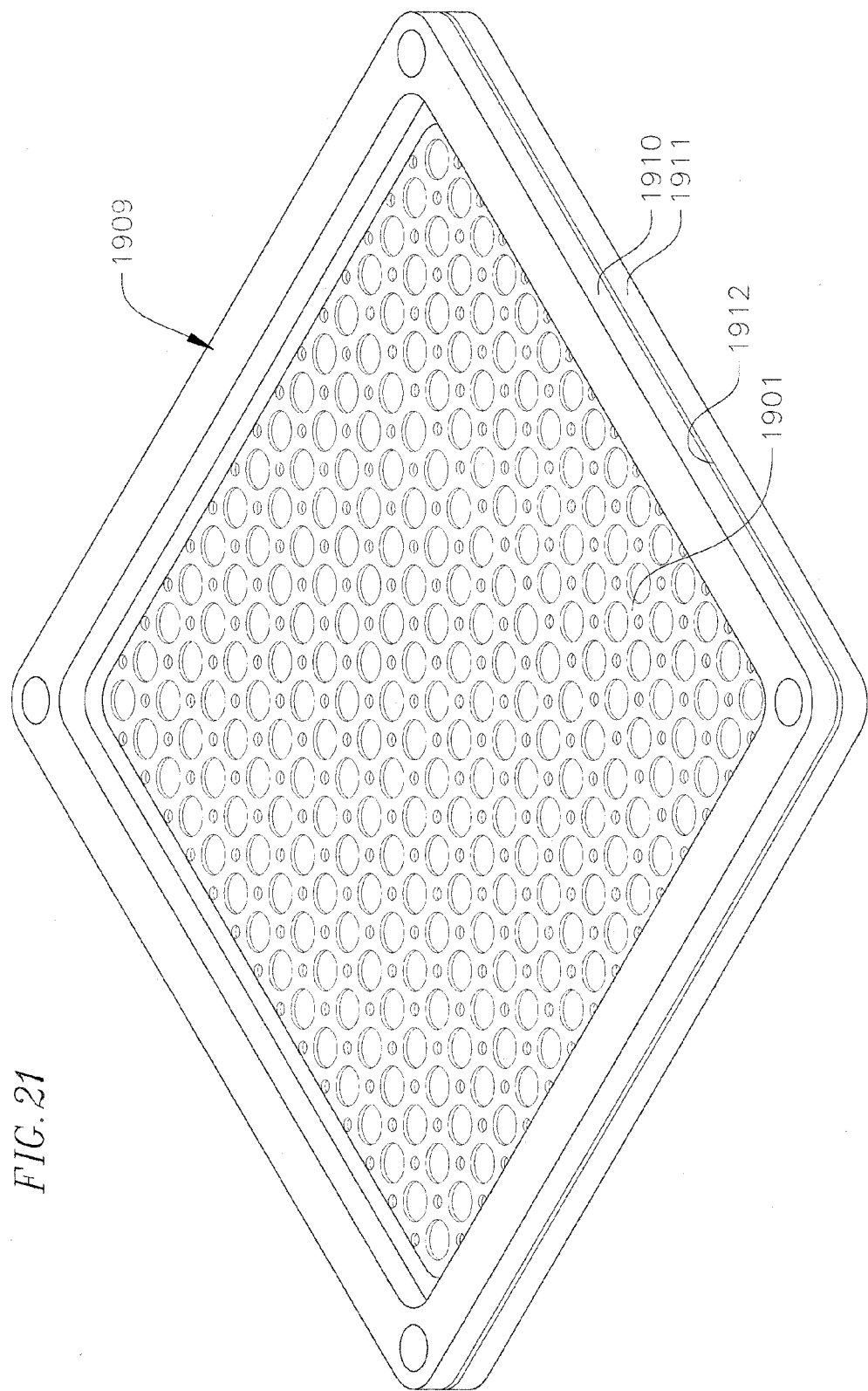
FIG. 21 illustrates a basal plane structure supported by a support structure according to one embodiment of the present disclosure.

In the embodiment illustrated in FIG. 21, the support structure 1909 includes an upper frame 1910 and a lower frame 1911 configured to surround a periphery of the basal plane structure 1901. An upper end 1912 of the lower frame 1911 is configured to support the basal plane structure 1901 and the upper frame 1910 is configured to be coupled to the lower frame 1911 to clamp the basal plane structure 1901 between the upper and lower frames 1910, 1911 and thereby secure the basal plane structure 1901 in place. In one or more alternate embodiments, the support structure 1909 may have any other suitable configuration, such as, for instance, a lower frame and a plurality of fasteners configured to secure the basal plane structure 1901 to the lower frame.

Figure 16A:
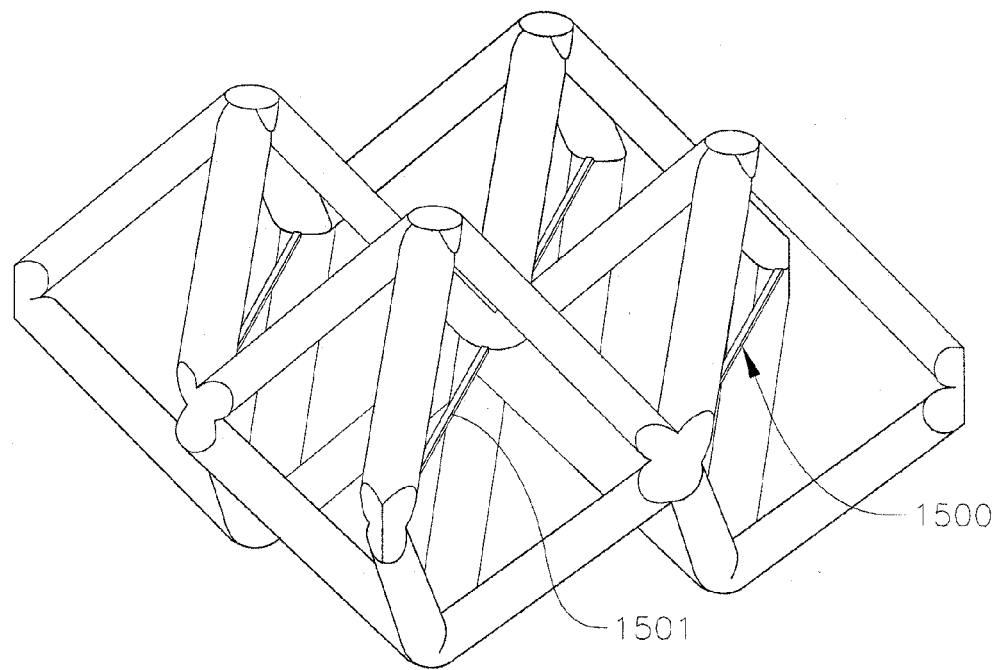
FIG. 16A is a perspective view of a microlattice structure having a basal plane structure according to another embodiment of the present invention.
Figure 16B:
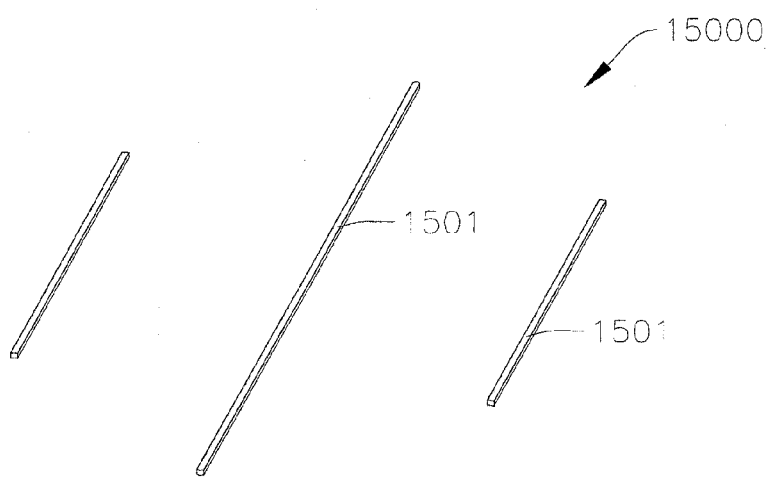
FIG. 16B is a top view of the basal plane structure of FIG. 16A having a plurality of separate diagonal members.

The method may include a task of selecting a basal plane structure 1901 having any suitable size, shape, and configuration depending on the desired performance characteristics of the microlattice structure 1900, such as, for instance, a flat, solid plate (FIG. 1A), a plate defining a plurality of collars (FIG. 7C), a flat plate defining a plurality of apertures (FIGS. 8B and 9B), a plurality of interconnected members (FIGS. 10B, 11B, 12B, 13B, 17, and 18), a mesh grid (FIG. 14B), or a plurality of separate members (FIGS. 15B and 16B). Additionally, in one or more embodiments, the method may include a task of selecting a non-uniform basal plane structure 1901 (e.g., a basal plane structure in which the spacing, size, orientation, and/or shape of the features of the basal plane structure vary across the basal plane structure), such as, for instance, a basal plane structure having varying spacing between the members (FIG. 17) or a basal plane structure having a tapered thickness (FIG. 18). The method may also include a task of selecting a basal plane structure 1901 formed from the desired material, such as, for instance, polymer materials (e.g., thermosets or thermoplastics), metal (e.g., aluminum or stainless steel), composites (e.g., carbon fiber, glass fiber reinforced polymer, fiberglass, or ceramic fibers), organic materials (e.g., wood, paper, or cardboard), ceramic cloth, natural cloth, polymeric cloth, metallic cloth, rubber, plastic, or any combination thereof.

Figure 20C:
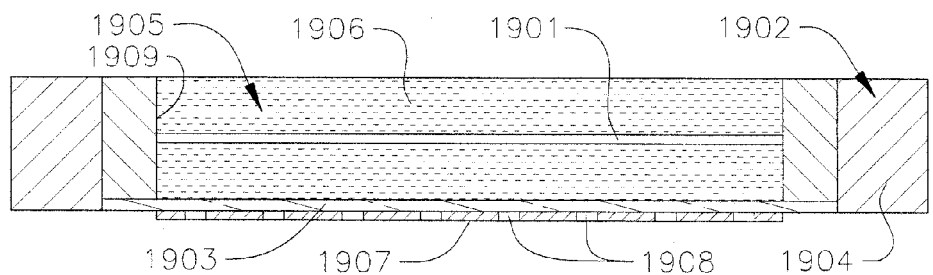
FIG. 20C illustrates a task of filling the reservoir with a volume of liquid photo-monomer according to one embodiment of the present disclosure.

With reference now to the embodiment illustrated in FIG. 20C, the method includes a task of filling the reservoir 1905 with the volume of liquid photo-monomer 1906 such that the basal plane structure 1901 is submerged in the volume of photo-monomer 1906. The photo-monomer 1906 is configured to polymerize when exposed to light within a particular range of wavelengths, such as, for instance, ultraviolet light (i.e., wavelengths between 250 nm and 400 nm). The liquid photo-monomer 1906 may be any suitable type of monomer configured to polymerize when exposed to light, such as, for instance, thiols, acrylates, methacrylates, or cationic polymers (e.g., photo-cured epoxies). Suitable liquid photo-monomers 1906 are described in U.S. Pat. No. 8,017,193, the entire content of which is incorporated herein by reference. In an alternate embodiment, the task of filling the reservoir 1905 with a volume of liquid photo-monomer 1906 may be performed before a task of submerging the basal plane structure 1901 supported by the support structure 1909 into the volume of photo-monomer 1906 in the reservoir 1905.

Figure 20D:
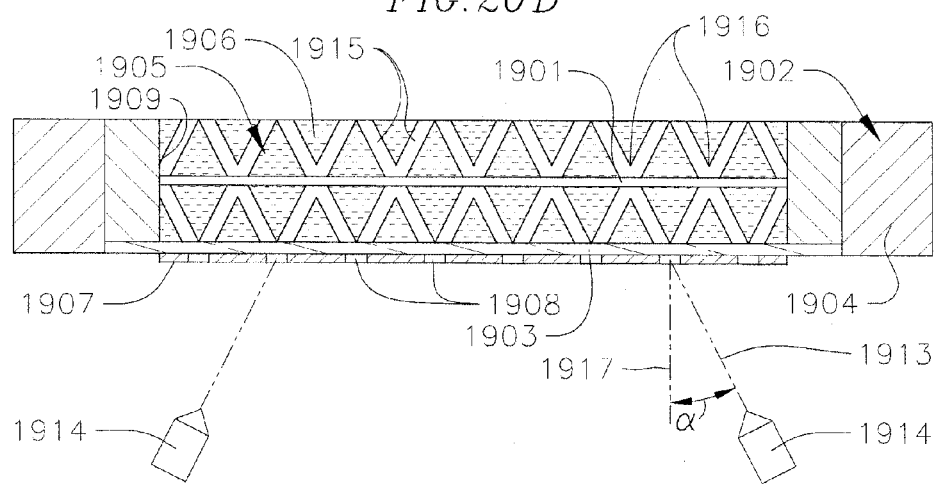
FIG. 20D illustrates a task of irradiating the volume of liquid photo-monomer with a plurality of collimated light beams to form a plurality of interconnected struts coupled to the basal plane structure according to one embodiment of the present disclosure.

Referring now to the embodiment illustrated in FIG. 20D, the method also includes a task of irradiating the volume of liquid photo-monomer 1906 in the reservoir 1905 with a plurality of collimated light beams 1913 (e.g., ultraviolet light ("UV") beams) from one or more light sources 1914. The task of irradiating the photo-monomer 1906 includes directing the collimated light beams 1913 from the one or more light sources 1914 up through the apertures 1908 in the mask 1907 and the translucent base 1903 of the mold 1902. In one embodiment, the task of irradiating the photo-monomer 1906 may also include directing the collimated light beams 1913 from the one or more light sources 1914 off of one or more mirrors and up through the apertures 1908 in the mask 1907. Regions of the liquid photo-monomer 1906 that are exposed to the collimated light beams 1913 cure (i.e., polymerize). The polymerized regions propagate up through the volume of photo-monomer 1906 and form a plurality of polymer optical waveguides 1915. In one embodiment, the polymer optical waveguides 1915 intersect or cross each other and are polymerized together into a unitary, ordered lattice structure. Together, the polymer optical waveguides 1915 define the struts of the microlattice structure 1900. Additionally, nodes 1916 are formed at the points of intersection between the struts 1915. Suitable methods for forming polymer optical waveguides are described in U.S. Pat. Nos. 7,653,279 and 7,382,959, the entire content of both of which are incorporated herein by reference.

In an embodiment in which the basal plane structure 1901 includes a plurality of apertures (see FIGS. 8B and 9B), the method may include a task of positioning and orienting the light sources 1914 and/or the mirrors such that the collimated light beams 1913 are directed through the apertures 1908 in the mask 1907 and the apertures in the basal plane structure 1901. By directing the collimated light beams 1913 through the apertures in the basal plane structure 1901, the collimated light beams 1913 will intersect or cross in the apertures in the basal plane structure 1901 such that the central nodes 1916 of the struts 1915 are formed within the apertures in the basal plane structure 1901 (i.e., the central nodes 1916 of the struts 1915 are aligned with the apertures in the basal plane structure 1901). Accordingly, as described above, the basal plane structure 1901 will extend between and interconnect the central nodes 1916 of the struts 1915 to transversely and rotationally constrain the central nodes 1916 of the struts 1915 and thereby increase the overall compressive strength and stiffness of the microlattice structure 1900.

In an embodiment in which the basal plane structure 1901 is a flat, solid plate made from a material translucent to the wavelengths of the collimated light beams 1913 (e.g., a UV-translucent material), such as, for instance, fiberglass, biaxially-oriented polyethylene terephthalate (BoPET), or polymer, the collimated light beams 1913 may be directed through the basal plane structure 1901. Because the basal plane structure 1901 is made out of a translucent material, the collimated light beams 1913 will pass through basal plane structure 1901 such that the polymer optical waveguides 1915 continue to propagate above the basal plane structure 1901. Accordingly, the struts 1915 will adhere to upper and lower surfaces of the basal plane structure 1901 such that the struts 1915 are integrally formed with the basal plane structure 1901.

In one or more embodiments in which the basal plane structure 1901 includes a plurality of members (e.g., interconnected diagonal members in FIG. 10B, interconnected longitudinal and transverse members in FIGS. 11B, 12B, 13B, 14B, 17, and 18, or separate diagonal or transverse members in FIGS. 15B and 16B), the method may include a task of directing one or more of the collimated light beams 1913 at one or more of the members such that the polymer optical waveguides 1915 grow around the members. In an embodiment in which the basal plane structure 1901 is made out of a UV-opaque material, such as, for instance, metal, metal alloy, or ceramic, the polymer optical waveguides 1915 will grow around the members and propagate above the members if the cross-sectional size of the collimated light beams 1913 and the apertures 1908 in the mask 1907 are larger than the members such that the collimated light beams 1913 are not completely obstructed by the members. In an alternate embodiment in which the members are made from a UV-translucent material, such as, for instance, fiberglass, biaxially-oriented polyethylene terephthalate (BoPET), or polymer, one or more of the collimated UV light beams 1913 may pass through the members such that the polymer optical waveguides 1915 continue to propagate above the members. Accordingly, the struts 1915 will adhere to upper and lower surfaces of the members such that the struts 1915 are integrally formed with the members.

Figure 19:
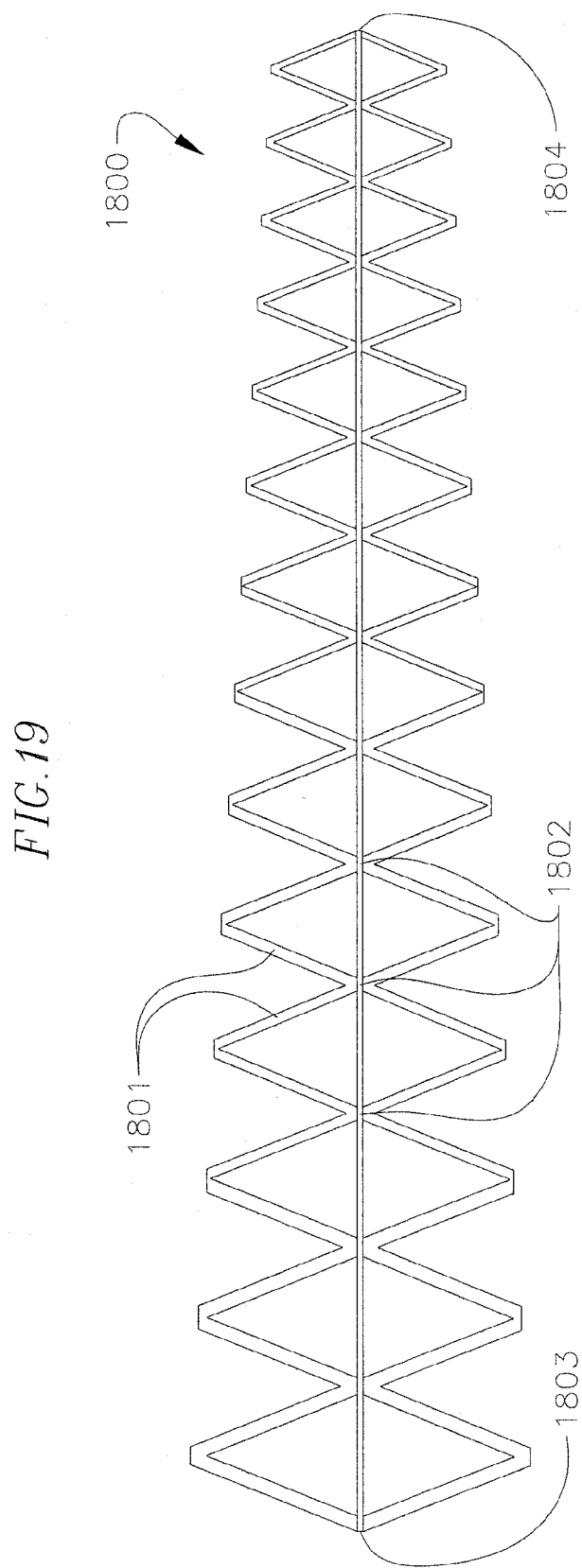
FIG. 19 is a side view of a microlattice structure having a tapered thickness and non-uniform spacing between nodes of the struts according to one embodiment of the present disclosure.

In one embodiment, the method may include one or more tasks for spatially tailoring the mechanical properties of the microlattice structure 1900 to achieve a desired compressive strength of the microlattice structure 1900 (e.g., the method may include one or more tasks for forming a non-uniform microlattice structure 1900). For instance, the strength and stiffness of the microlattice structure 1900 may vary across the microlattice structure 1900 by varying the length of the struts 1915 and the spacing between the nodes 1916 of the struts 1915, as illustrated in FIG. 19. The strength and stiffness of the microlattice structure 1900 is a function of several factors, including the orientation of the polymer optical waveguides 1915, the cross-sectional shape and size of the polymer optical waveguides 1915, and the spacing between the nodes 1916 of the polymer optical waveguides 1915. Accordingly, in one or more embodiments, the method may include one or more tasks for varying the orientation, shape, size, and/or spacing of the polymer optical waveguides 1915 (i.e., the struts) of the microlattice structure 1900.

The orientation of the polymer optical waveguides 1915 of the microlattice structure 1900 depends on the direction in which the polymer optical waveguides 1915 propagate through the volume of liquid photo-monomer 1906 in the reservoir 1905. In one embodiment, the direction in which the polymer optical waveguides 1915 propagate through the volume of photo-monomer 1906 is a function of an incident angle $\alpha$ of the one or more light sources 1914 and the collimated light beams 1913 produced therefrom relative to an imaginary axis 1917 perpendicular to the mask 1907 (i.e., the orientation of the polymer optical waveguides 1915 is a function of the angles $\alpha$ at which the one or more collimated light beams 1913 strike the volume of photo-monomer 1906 in the reservoir 1905). In one or more alternate embodiments, the direction in which the polymer optical waveguides 1915 propagate through the volume of photo-monomer 1906 is a function of the orientation of one or more mirrors and the orientation of the one or more light sources 1914 relative to the mirrors. Accordingly, in one embodiment, the method may include a task of positioning the one or more light sources 1914 and/or the one or more mirrors at one or more different angles and directing one or more light beams 1913 through the apertures 1908 in the mask 1907. The method may include positioning the light sources 1914 and/or the mirrors into any suitable number of different incident angles, such as, for instance, from two to ten different angular positions. Additionally, in one or more embodiments, the method may include varying the incident angles $\alpha$ of the light beams 1913 and/or the orientation of the mirrors at different locations along the mask 1907 such that the orientation of the polymer optical waveguides 1915 varies across the microlattice structure 1900. The light sources 1914 may be any suitable types or kinds of lamps capable of emitting light beams 1913 within a range of wavelengths configured to polymerize the liquid photo-monomer 1906, such as, for instance, mercury arc lamps or light-emitting diodes (LEDs).

The cross-sectional shape and size of the polymer optical waveguides 1915 is a function of the shape and size of the collimated light beams 1913 striking the volume of photo-monomer 1906. The cross-sectional shape and size of the collimated light beams 1913 striking the photo-monomer 1906 are dependent upon the shape and size of the apertures 1908 in the mask 1907. The apertures 1908 in the mask 1907 may have any desired shape, such as, for instance, circular, triangular, pentagonal, hexagonal, polygonal, oval, or star-shaped. Accordingly, the method may also include a task of selecting a mask 1907 having apertures 1908 with a shape and size corresponding to the desired cross-sectional shape and size of the polymer optical waveguides 1915 of the microlattice structure 1900. Additionally, in one or more embodiments, the method may include a task of selecting a mask 1907 having a plurality of apertures 1908 that vary in shape and/or size across the mask 1907. Accordingly, when the collimated light beams 1913 are directed through the apertures 1908 and into the volume of the photo-monomer 1906 to form the polymer optical waveguides 1915, the shape and/or size of the polymer optical waveguides 1915 varies across the microlattice structure 1900.

The spacing between the polymer optical waveguides 1915 (i.e., the density of the polymer optical waveguides 1915 in the microlattice structure 1900) and the open volume fraction of the microlattice structure 1900 (i.e., the volume ratio of air to polymer optical waveguides 1915 in the microlattice structure 1900) are a function of the spacing between the apertures 1908 in the mask 1907 and the number of collimated light beams 1913 directed through the apertures 1908. In one or more embodiments, the method includes a task of selecting a mask 1907 wherein the spacing between the apertures 1908 varies across the mask 1907. In one embodiment in which the basal plane structure 1901 includes a plurality of apertures, the method may also include a task of selecting a basal plane structure 1901 wherein the spacing between the apertures varies across the basal plane structure 1901. Accordingly, when the collimated light beams 1913 are directed through the apertures 1908 in the mask 1907 and into the volume of photo-monomer 1906 to form the polymer optical waveguides 1915, the spacing between the polymer optical waveguides 1915 varies across the microlattice structure 1900 (e.g., the spacing between the nodes 1916 of the polymer optical waveguides 1915 varies across the microlattice structure 1900 as illustrated, for instance, in FIG. 19).

According to another embodiment, the method may include a task of selecting a mask 1907 having a uniform, equidistant pattern of apertures 1908 and directing a greater number of collimated light beams 1913 through some of the apertures 1908 than a remainder of the apertures 1908 such that the spacing between the polymer optical waveguides 1915 varies across the microlattice structure 1900. In a further embodiment, the method may include a task of both selecting a mask 1907 wherein the spacing between the apertures 1908 varies across the mask 1907 and directing a greater number of collimated light beams 1913 through the more closely spaced apertures 1908 than the remainder of the apertures 1908 to form a microlattice structure 1900 wherein the spacing between the polymer optical waveguides 1915 varies across the microlattice structure 1900.

The method also includes a task of removing the microlattice structure 1900 having the basal plane structure 1901 from the reservoir 1905 and the unpolymerized liquid photo-monomer 1906 remaining in the reservoir 1905. The method may also include a task of fully curing the polymer optical waveguides 1915 (i.e., the struts) of the microlattice structure 1900 after the microlattice structure 1900 has been removed from the reservoir 1905. In one embodiment, the task of fully curing the struts 1915 includes irradiating the struts 1915 with light (e.g., UV light) to fully cross-link the polymer optical waveguides 1915.

Although the microlattice structures 1900 formed according to the methods described above include a plurality of polymer optical waveguides 1915, in one or more alternate embodiments, the method may include one or more tasks for forming a microlattice structure 1900 out of any other suitable material, such as, for instance, metal (e.g., nickel, aluminum), metal alloy (e.g., nickel-phosphorous alloy), ceramic, parylene, or any combination thereof. In one or more embodiments, the method may include a task of using the polymer optical waveguides 1915 as a template onto which one or more dissimilar materials may be deposited onto or formed around. The dissimilar materials may be deposited onto or formed around the polymer optical waveguides 1915 by any suitable process, such as, for instance, electrodeposition, electroplating, vapor deposition (e.g., chemical vapor deposition (CVD)), spray coating, dip coating, or any combination thereof. In one embodiment, the method may also include a task of selectively removing the polymer optical waveguides 1915 by any suitable process, such as, for instance, by chemically etching the polymer optical waveguides 1915. Selectively removing the polymer, optical waveguides 1915 leaves a plurality of interconnected hollow tubular struts formed out of the material previously deposited onto the polymer optical waveguides 1915.

Figure 22A:
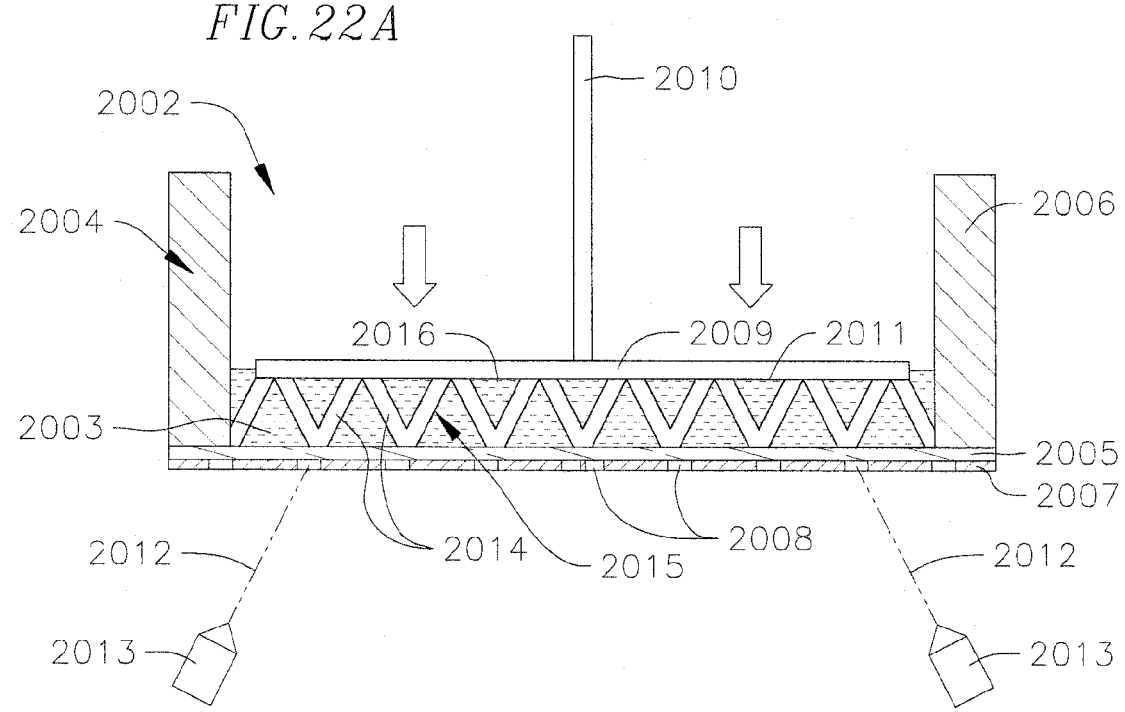
FIG. 22A illustrates a task of filling a reservoir defined by a mold with a volume of liquid photo-monomer, a task of actuating a moveable platform to lower a substrate into contact with the volume of photo-monomer, a task of covering one end of a mold with a mask, and a task of irradiating the volume of liquid photo-monomer with a first plurality of collimated light beams to form a first layer of interconnected struts coupled to the substrate according to one embodiment of the present disclosure.
Figure 22B:
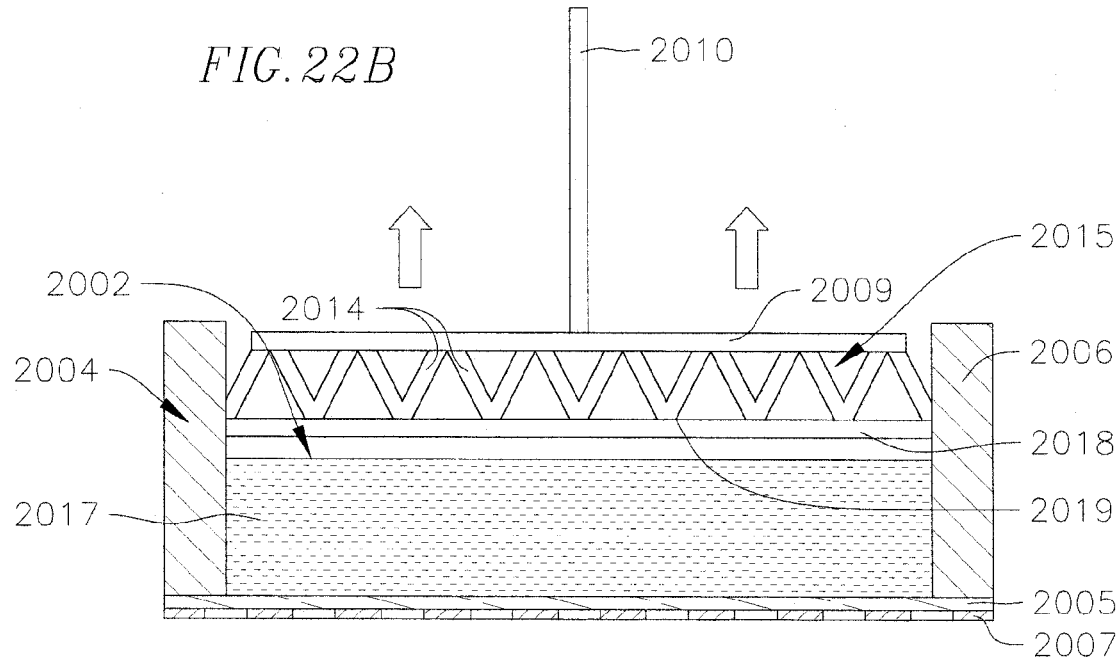
FIG. 22B illustrates a task of actuating the moveable platform to lift the substrate and raise the first layer of interconnected struts out of a remaining volume of photo-monomer and a task of coupling a basal plane structure to a lower end of the first layer of interconnected struts according to one embodiment of the present disclosure.
Figure 22C:
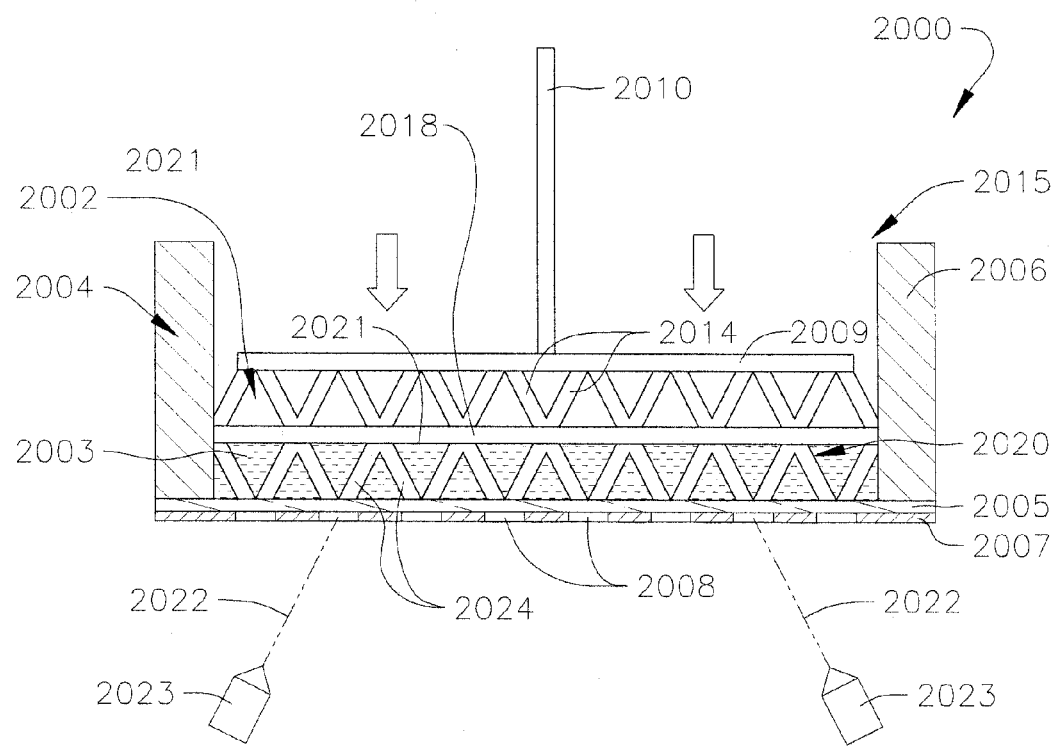
FIG. 22C illustrates a task of actuating the moveable platform to lower the basal plane structure into contact with the volume of photo-monomer and a task of irradiating the volume of liquid photo-monomer with a second plurality of collimated light beams to form a second layer of interconnected struts coupled to the basal plane structure according to one embodiment of the present disclosure.

With reference now to FIGS. 22A-22C, a method of forming a microlattice structure 2000 having a basal plane structure according to another embodiment of the present disclosure will now be described. As illustrated in FIG. 22A, the method includes a task of filling a reservoir 2002 with a volume of liquid photo-monomer 2003 that is configured to polymerize when exposed to light within a particular range of wavelengths, such as, for instance, ultraviolet light (i.e., wavelengths between 250 nm and 400 nm). The liquid photo-monomer 2003 may be any suitable type or kind of monomer configured to polymerize when exposed to light, such as, for instance, thiols, acrylates, methacrylates, or cationic polymers (e.g., photo-cured epoxies). In the illustrated embodiment, the reservoir 2002 is defined by a mold 2004 having a translucent base 2005 and vertical wall or rim 2006 extending upward from a periphery of the base 2005. The base 2005 is translucent to those wavelengths of light that are configured to polymerize the liquid photo-monomer 2003. The liquid photo-monomer 2003 may be filled to any desired level within the reservoir 2002, such as, for instance, from approximately or about 0.1 inch to approximately or about 1 inch above the base 2005 of the mold 2004, depending on the desired height of one layer of the microlattice structure 2000.

With continued reference to FIG. 22A, the method also includes a task of covering the translucent base 2005 of the mold 2004 with a mask 2007. The mask 2007 defines a plurality of apertures 2008. The mask 2007 may define any desired number of apertures 2008 and the apertures 2008 may have any desired size, shape, and spacing, depending upon the desired characteristics of the microlattice structure 2000. The mask 2007 may be made of any suitable material, such as, for instance, biaxially-oriented polyethylene terephthalate.

Still referring to the embodiment illustrated in FIG. 22A, the method also includes a task of lowering a substrate 2009 attached to a moveable platform 2010 until the substrate 2009 abuts against an upper surface 2011 of the volume of photo-monomer 2003. According to an alternate embodiment, the method may include a task of moving the substrate 2009 into the desired position and a task of injecting the liquid photo-monomer 2003 into the reservoir 2002 through a port in the mold 2004 until the liquid photo-monomer 2003 contacts the substrate 2009.

With continued reference to FIG. 22A, the method also includes a task of irradiating the volume of liquid photo-monomer 2003 in the reservoir 2002 with a plurality of light beams 2012 (e.g., collimated or substantially collimated ultraviolet light ("UV") beams) from one or more light sources 2013. The task of irradiating the photo-monomer 2003 includes directing the light beams 2012 from the one or more light sources 2013 up through the apertures 2008 in the mask 2007 and through the translucent base 2005 of the mold 2004. The task of irradiating the photo-monomer 2003 may also include directing the collimated light beams 2012 from the one or more light sources 2013 off of one or more mirrors and up through the apertures 2008 in the mask 2007. Regions of the liquid photo-monomer 2003 that are exposed to the collimated light beams 2012 cure (i.e., polymerize). The polymerized regions propagate up through the volume of photo-monomer 2003 and form a plurality of polymer optical waveguides 2014. The polymer optical waveguides 2014 define the struts of the microlattice structure 2000. In one embodiment, the polymer optical waveguides 2014 intersect each other and are polymerized together into a first layer 2015 of the microlattice structure 2000 having an ordered array of half unit cells.

Additionally, the length to which the polymer optical waveguides 2014 propagate through the volume of photo-monomer 2003 in the reservoir 2002 is a function of several factors, including the size, intensity, and exposure time of the incident light beams 2012 and the light absorption/transmission properties of the liquid photo-monomer 2003. Accordingly, in one embodiment, the method includes a task of selecting one or more light sources 2013 configured to produce light beams 2012 having a suitable intensity and exposing the volume of photo-monomer 2003 in the reservoir 2002 to the light beams 2012 for a sufficient duration such that the polymer optical waveguides 2014 propagate all the way up through the reservoir 2002 and adhere to a lower surface 2016 of the substrate 2009.

With reference now the embodiment illustrated in FIG. 22B, the method also includes a task of actuating the moveable platform 2010 to raise the substrate 2009 until the first layer 2015 of the microlattice structure 2000 is lifted out of a remaining volume of unpolymerized photo-monomer 2017 in the reservoir 2002. The method also includes a task of coupling a basal plane structure 2018 to a lower end 2019 of the first layer 2015 of the microlattice structure 2000. The basal plane structure 2018 may be coupled to the lower end 2019 of the first layer 2015 by any suitable process, such as, for instance, by bonding or adhering. In one embodiment, the basal plane structure 2018 may be coupled to the lower end 2019 of the first layer 2015 by submerging the basal plane structure 2018 in the photo-monomer 2017, lowering the substrate 2009 until the lower end 2019 of the first layer 2015 contacted the basal plane structure 2018, and then briefly irradiating the photo-monomer 2017 (i.e., flashing the photo-monomer 2017) to cause a portion of the photo-monomer 2017 in contact with the first layer 2015 and the basal plane structure 2018 to cure (i.e., polymerize) and thereby couple the basal plane structure 2018 to the lower end 2019 of the first layer 2015 of the microlattice structure 2000. The method may include a task of selecting a basal plane structure 2018 having any suitable size, shape, and configuration depending on the desired performance characteristics of the microlattice structure 2000, such as, for instance, a flat, solid plate (FIG. 1A), a plate defining a plurality of collars (FIG. 7C), a flat plate defining a plurality of apertures (FIGS. 8B and 9B), a plurality of interconnected members (FIGS. 10B, 11B, 12B, 13B, 17, and 18), a mesh grid (FIG. 14B), or a plurality of separate members (FIGS. 15B and 16B). Additionally, in one or more embodiments, the method may include a task of selecting a non-uniform basal plane structure 2018 (e.g., a basal plane structure in which the spacing, size, orientation, and/or shape of the features of the basal plane structure vary across the basal plane structure), such as, for instance, a basal plane structure having varying spacing between the members (FIG. 17) or a basal plane structure having a tapered thickness (FIG. 18). The method may also include a task of selecting a basal plane structure 2018 formed from the desired material, such as, for instance, polymer materials (e.g., thermosets or thermoplastics), metal (e.g., aluminum or stainless steel), composites (e.g., carbon fiber, glass fiber reinforced polymer, fiberglass, or ceramic fibers), organic materials (e.g., wood, paper, or cardboard), ceramic cloth, natural cloth, polymeric cloth, metallic cloth, rubber, plastic, or any combination thereof.

The method may also include a task of adding an additional volume of photo-monomer to the reservoir 2002 or removing a volume of photo-monomer from the reservoir 2002 of the mold 2004 depending upon the desired thickness of a second layer 2020 (see FIG. 22C) of the microlattice structure 2000. With reference now to the embodiment illustrated in FIG. 22C, the method also includes a task of actuating the moveable platform 2010 to lower the substrate 2009, the first layer 2015 of the microlattice structure 2000, and the basal plane structure 2018 until the basal plane structure 2018 contacts an upper surface 2021 of the volume of photo-monomer 2003 in the reservoir 2002. The method then includes a task of irradiating the volume of liquid photo-monomer 2003 in the reservoir 2002 with a plurality of light beams 2022 (e.g., collimated or substantially collimated UV light beams) from the one or more light sources 2023 to form the second layer 2020 of the microlattice structure 2000. As described above, the task of irradiating the photo-monomer 2003 includes directing the light beams 2022 from the one or more light sources 2023 up through the apertures 2008 in the mask 2007. The task of irradiating the photo-monomer 2003 may also include directing the light beams 2022 from the one or more light sources 2023 off of one or more mirrors and up through the apertures 2008 in the mask 2007 and through the translucent base 2005 of the mold 2004. Regions of the liquid photo-monomer 2003 that are exposed to the light beams 2022 cure (i.e., polymerize). The polymerized regions propagate up through the volume of photo-monomer 2022 and form a plurality of polymer optical waveguides 2024. The polymer optical waveguides 2024 define the struts of the microlattice structure 2000. In one embodiment, the polymer optical waveguides 2024 intersect each other and are polymerized together into the second layer 2020 of the microlattice structure 2000 having an ordered array of half unit cells.

In one embodiment, the task of irradiating the volume of photo-monomer 2022 includes exposing the volume of photo-monomer 2003 in the reservoir 2002 to the light beams 2022 for a sufficient duration such that the polymer optical waveguides 2024 propagate all the way up through the reservoir 2002 and adhere to the basal plane structure 2018. In an embodiment in which the basal plane structure 2018 defines a plurality of apertures (FIGS. 8B and 9B), the method may include a task of orienting the light sources 2023 and/or the mirrors such that the plurality of light beams 2022 are directed through the apertures in the basal plane structure 2018. By directing the collimated light beams 2022 through the apertures in the basal plane structure 2018, the collimated light beams 2022 will intersect in the apertures in the basal plane structure 2018 such that the nodes of the struts 2024 are formed within the apertures in the basal plane structure 2018. Additionally, the polymer optical waveguides 2024 that propagate through the apertures in the basal plane structure 2018 may adhere to the first layer 2015 of the microlattice structure 2000 (i.e., the struts 2024 of the second layer 2020 may adhere to the struts 2014 of the first layer 2015 of the microlattice structure 2000). In an embodiment in which the basal plane structure 2018 includes a plurality of members (e.g., interconnected diagonal members in FIG. 10B, interconnected longitudinal and transverse members in FIGS. 11B, 12B, 13B, 14B, 17, and 18, or separate diagonal or transverse members in FIGS. 15B and 16B), the method may include a task of directing one or more of the collimated light beams 2022 at one or more of the members such that the polymer optical waveguides 2024 grow around and adhere to the members.

In one embodiment, the method may include a task of reorienting and/or repositioning the one or more light sources 2023 and/or the one or more mirrors before irradiating the volume of photo-monomer 2003 with a plurality of collimated light beams 2022 to form the second layer 2020 of the microlattice structure 2000. Accordingly, the orientation of the struts 2024 of the second layer 2020 of the microlattice structure 2000 may be the same or different than the orientation of the struts 2014 of the first layer 2015 of the microlattice structure 2000. Additionally, in one embodiment, the method may include a task of replacing the first mask 2007 used during the task of forming the first layer 2015 with a second mask defining a plurality of apertures that differ in size, shape, and/or spacing from the apertures 2008 in the first mask 2008 such that the size, cross-sectional shape, and/or spacing of the struts 2024 in the second layer 2020 differ from the size, cross-sectional shape, and/or spacing of the struts 2014 in the first layer 2015 of the microlattice structure 2000. The method may also include a task of directing more or fewer collimated light beams 2022 through the apertures 2008 of the mask 2007 during the task of forming the second layer 2020 than during the task of forming the first layer 2015 of the microlattice structure 2000 such that the second layer 2020 of the microlattice structure 2000 has a different number of struts 2024 than the first layer 2015 of the microlattice structure 2000.

The above-described tasks of actuating the moveable platform 2010 to raise the substrate 2009 and lift the microlattice layer 2015 out of the volume of photo-monomer 2003 in the reservoir 2002, coupling a basal plane structure 2018 to a lower end 2019 of the microlattice layer 2015, adding or removing a volume of photo-monomer to the reservoir 2002, and irradiating the volume of photo-monomer 2003 with a plurality of collimated light beams 2012 may be repeated any suitable number of times to achieve a microlattice structure 2000 having a desired number of layers and a desired thickness depending on the intended application of the microlattice structure 2000 and the desired compressive strength and stiffness of the microlattice structure 2000.

Additionally, in one or more embodiments, the method may include a task of depositing a material, such as, for instance, metal (e.g., nickel, aluminum), metal alloy (e.g., nickel-phosphorous alloy), ceramic, parylene, or any combination thereof, onto the polymer optical waveguides 2014, 2024 and/or the basal plane structure 2018. The material may be deposited onto the polymer optical waveguides 2014, 2024 and/or the basal plane structure 2018 by any suitable process, such as, for instance, electrodeposition, electroplating, vapor deposition (e.g., chemical vapor deposition (CVD)), spray coating, dip coating, or any combination thereof. The method may also include a task of selectively removing the polymer optical waveguides 2014, 2024 and/or the basal plane structure 2018 by any suitable process, such as, for instance, chemical etching, to form a plurality of interconnected hollow tubular struts and/or a hollow basal plane structure formed out of the material previously deposited onto the polymer optical waveguides 2014, 2024 and/or the basal plane structure 2018. Suitable methods for manufacturing a stacked microlattice structure are described in U.S. patent application Ser. No. 14/461,841 entitled "Stacked Microlattice Materials and Fabrication Process", filed on Aug. 18, 2014, the entire content of which is incorporated herein by reference.

Figure 23A:
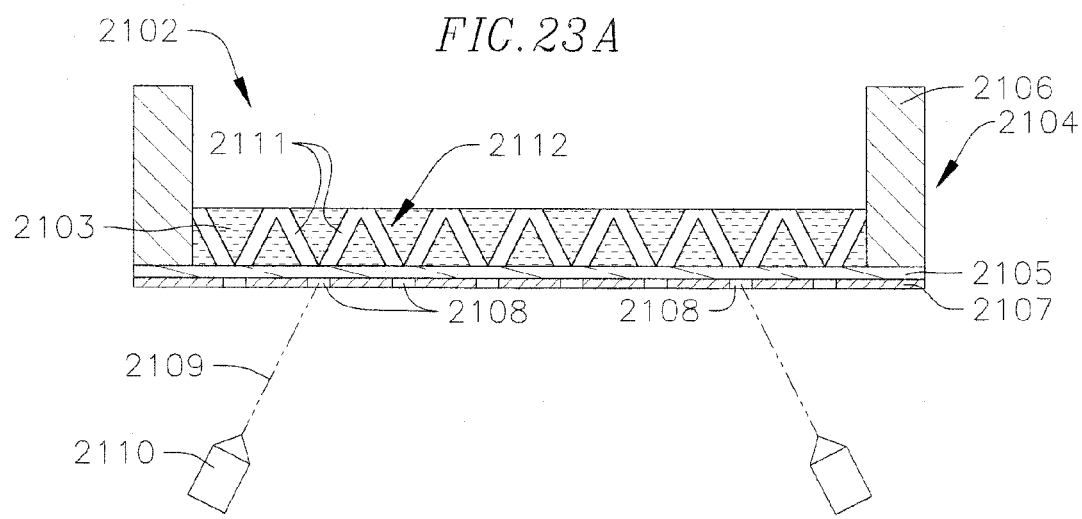
FIG. 23A illustrates a task of irradiating a volume of liquid photo-monomer in a mold with a plurality of collimated light beams to form a first plurality of interconnected struts according to one embodiment of the present disclosure.
Figure 23B:
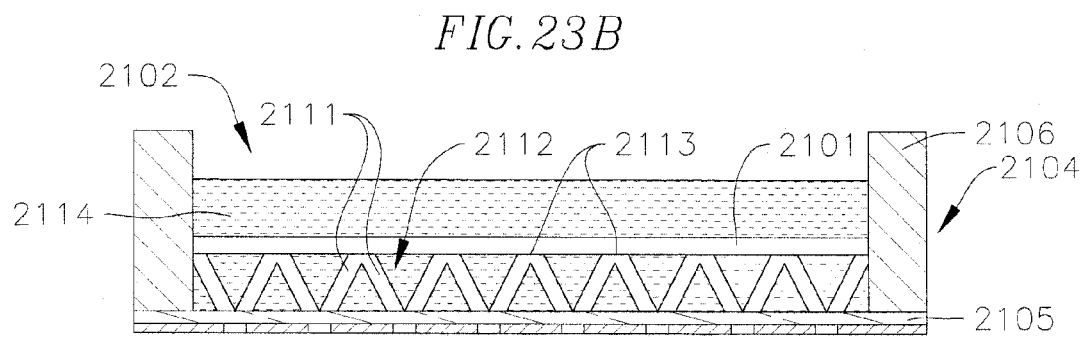
FIG. 23B illustrates a task of coupling a basal plane structure to one end of the first plurality of interconnected struts of FIG. 23A and filling the volume of liquid photo-monomer to a second height.
Figure 23C:
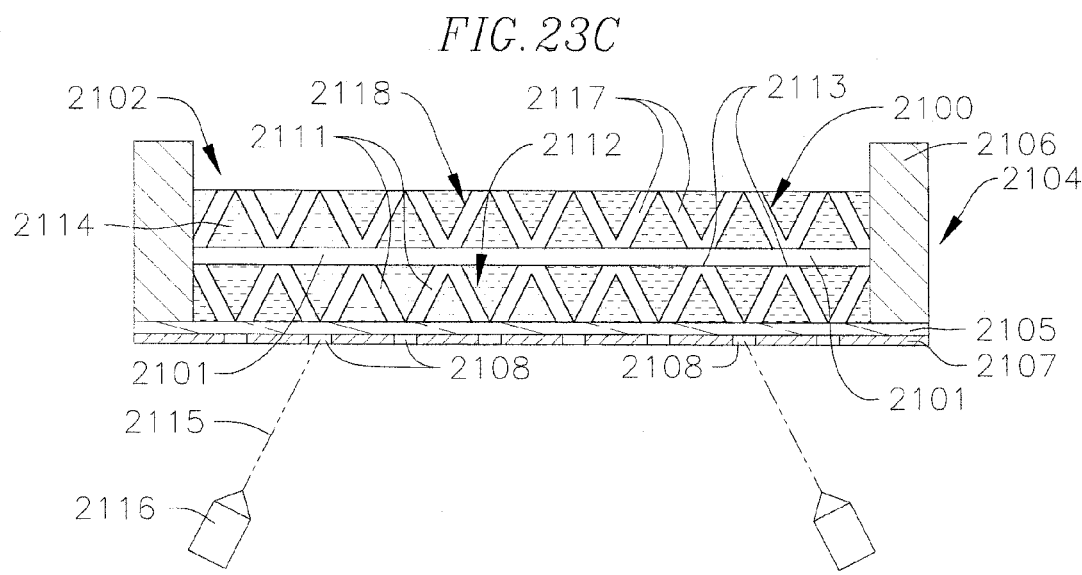
FIG. 23C illustrates a task of irradiating the volume of liquid photo-monomer with a plurality of collimated light beams to form a second plurality of interconnected struts coupled to the basal plane structure according to one embodiment of the present disclosure.

With reference now to FIGS. 23A-23C, a method of forming a microlattice structure 2100 having a basal plane structure 2101 according to another embodiment of the present disclosure will now be described. As illustrated in FIG. 23A, the method includes a task of filling at least a portion of a reservoir 2102 with a volume of liquid photo-monomer 2103 that is configured to polymerize when exposed to light within a particular range of wavelengths, such as, for instance, ultraviolet light (i.e., wavelengths between 250 nm and 400 nm). The liquid photo-monomer 2103 may be any suitable type or kind of monomer configured to polymerize when exposed to light, such as, for instance, thiols, acrylates, methacrylates, or cationic polymers (e.g., photo-cured epoxies). In the illustrated embodiment, the reservoir 2102 is defined by a mold 2104 having a translucent base 2105 and vertical wall or rim 2106 extending upward from a periphery of the base 2105. The base 2105 is translucent to those wavelengths of light that are configured to polymerize the liquid photo-monomer 2103. The liquid photo-monomer 2103 may be filled to any desired level within the reservoir 2102, such as, for instance, from approximately or about 0.1 inch to approximately or about 1 inch above the base 2105 of the mold 2104, depending on the desired height of one layer, or a portion of one layer, of the microlattice structure 2100.

With continued reference to FIG. 23A, the method also includes a task of covering the translucent base 2105 of the mold 2104 with a mask 2107. The mask 2107 defines a plurality of apertures 2108. The mask 2107 may define any desired number of apertures 2108 and the apertures 2108 may have any desired size, shape, and spacing, depending upon the desired characteristics of the microlattice structure 2100. The mask 2107 may be made of any suitable material, such as, for instance, biaxially-oriented polyethylene terephthalate.

With continued reference to FIG. 23A, the method also includes a task of irradiating the volume of liquid photo-monomer 2103 in the reservoir 2102 with a plurality of light beams 2109 (e.g., collimated or substantially collimated ultraviolet light ("UV") beams) from one or more light sources 2110. The task of irradiating the photo-monomer 2103 includes directing the light beams 2109 from the one or more light sources 2110 up through the apertures 2108 in the mask 2107 and through the translucent base 2105 of the mold 2104. The task of irradiating the photo-monomer 2103 may also include directing the light beams 2109 from the one or more light sources 2110 off of one or more mirrors and up through the apertures 2108 in the mask 2107. Regions of the liquid photo-monomer 2103 that are exposed to the light beams 2109 cure (i.e., polymerize). The polymerized regions propagate up through the volume of photo-monomer 2103 and form a plurality of polymer optical waveguides 2111. The polymer optical waveguides 2111 define the struts of the microlattice structure 2100. In one embodiment, the polymer optical waveguides 2111 intersect each other and are polymerized together into a first region or layer 2112 of the microlattice structure 2100 having an ordered array of half unit cells.

With reference now to FIG. 23B, the method also includes a task of coupling a basal plane structure 2101 to an upper end 2113 of the first region or layer 2112 of the microlattice structure 2100. Accordingly, in one embodiment, the lower portion of the microlattice structure 2100 may support the basal plane structure 2101 in a similar manner as the support structure 1909 illustrated in FIG. 21. The basal plane structure 2101 may be coupled to the first region or layer 2112 of the microlattice structure 2100 by any suitable process, such as, for instance, by bonding or adhering. The basal plane structure 2101 may have any desired size, shape, and configuration depending on the desired performance characteristics of the microlattice structure 2100, such as, for instance, a flat, solid plate (FIG. 1A), a plate defining a plurality of collars (FIG. 7C), a flat plate defining a plurality of apertures (FIGS. 8B and 9B), a plurality of interconnected members (FIGS. 10B, 11B, 12B, 13B, 17, and 18), a mesh grid (FIG. 14B), or a plurality of separate members (FIGS. 15B and 16B). Additionally, in one or more embodiments, the method may include a task of selecting a non-uniform basal plane structure 2101 (e.g., a basal plane structure in which the spacing, size, orientation, and/or shape of the features of the basal plane structure vary across the basal plane structure), such as, for instance, a basal plane structure having varying spacing between the members (FIG. 17) or a basal plane structure having a tapered thickness (FIG. 18). The method may also include a task of selecting a basal plane structure 2101 formed from the desired material, such as, for instance, polymer materials (e.g., thermosets or thermoplastics), metal (e.g., aluminum or stainless steel), composites (e.g., carbon fiber, glass fiber reinforced polymer, fiberglass, or ceramic fibers), organic materials (e.g., wood, paper, or cardboard), ceramic cloth, natural cloth, polymeric cloth, metallic cloth, rubber, plastic, or any combination thereof.

Still referring to the embodiment illustrated in FIG. 23B, the method also includes a task of adding a volume of liquid photo-monomer 2114 to the reservoir 2102 such that the first region or layer 2112 of the microlattice structure 2100 and the basal plane structure 2101 are submerged in the photo-monomer 2114 (e.g., a volume of photo-monomer 2114 may be added to the reservoir 2102 such that the height of the photo-monomer 2114 in the reservoir 2102 exceeds the combined height of the first region or layer 2112 of the microlattice structure 2100 and the basal plane structure 2101). In one embodiment, the photo-monomer 2114 may be the same or similar to the photo-monomer 2103 used during the task of forming the first region or layer 2112 of the microlattice structure 2100, although in one or more alternate embodiments, the photo-monomer 2114 may be different than the first photo-monomer 2103. In one embodiment, the volume of photo-monomer 2103 remaining in the reservoir 2102 after forming the first region or layer 2112 of the microlattice structure 2100 may be drained or otherwise removed from the reservoir 2102 and a volume of photo-monomer 2114 different than the first photo-monomer 2103 may be filled in the reservoir 2102 (i.e., the volume of photo-monomer 2103 that was not polymerized during the task of forming the first region or layer 2112 of the microlattice structure 2100 may be removed from the reservoir 2102 and then the reservoir 2102 may be filled with a different photo-monomer 2114).

With reference now to the embodiment illustrated in FIG. 23C, the method also includes a task of irradiating the volume of photo-monomer 2114 in the reservoir 2102 with a plurality of light beams 2115 (e.g., collimated or substantially collimated ultraviolet light ("UV") beams) from one or more light sources 2116. The task of irradiating the photo-monomer 2114 includes directing the light beams 2115 from the one or more light sources 2116 up through the apertures 2108 in the mask 2107 and through the translucent base 2105 of the mold 2104. The task of irradiating the photo-monomer 2114 may also include directing the light beams 2115 from the one or more light sources 2116 off of one or more mirrors and up through the apertures 2108 in the mask 2107.

In the illustrated embodiment, the light beams 2115 are directed through the photo-monomer 2114 at the same angles that the light beams 2109 were directed through the photo-monomer 2103 during the task of forming the first layer or region 2112 of the microlattice structure 2100 (see FIG. 23A). Accordingly, in the illustrated embodiment, the light beams 2115 are directed through the polymer optical waveguides 2111 of the first layer or region 2112 such that polymer optical waveguides 2117 grow or extend up from the upper end 2113 of the polymer optical waveguides 2111 and above the basal plane structure 2101 (e.g., the light beams 2115 pass through the polymer optical waveguides 2111 and irradiate the photo-monomer 2114 above the basal plane structure 2101 to form polymer optical waveguides 2117 extending above the basal plane structure 2101 and upwards from the upper end 2113 of the polymer optical waveguides 2111 in the first layer or region 2112). Additionally, in the illustrated embodiment, the polymer optical waveguides 2117 extend or grow sufficiently into the photo-monomer 2114 such that the polymer optical waveguides 2117 are polymerized together into a unitary, lattice structure. In the illustrated embodiment, the polymer optical waveguides 2117 intersect each other and are polymerized together into a second region or layer 2118 of the microlattice structure 2100 having an ordered array of half unit cells. In an alternate embodiment, the height to which the photo-monomer 2114 is filled in the reservoir 2102 may be selected such that the polymer optical waveguides 2117 are discrete, separate segments. Accordingly, in the illustrated embodiment, the basal plane structure 2101 is sandwiched between the first and second layers 2112, 2118 of the microlattice structure 2100.

Additionally, although in the illustrated embodiment the light beams 2115 are directed through the apertures 2108 in the mask 2107 at the same angles that the light beams 2109 were directed through the apertures 2108 in the mask 2107, in one or more alternate embodiments, the light beams 2115 may be directed through the apertures 2108 in the mask 2107 at any other suitable angles depending on the desired orientation of the polymer optical waveguides 2117 in the second region or layer 2118 of the microlattice structure 2100. In an embodiment in which the basal plane structure 2101 defines a plurality of apertures (FIGS. 8B and 9B), the method may include a task of orienting the light sources 2116 and/or the mirrors such that the plurality of light beams 2115 are directed through the apertures in the basal plane structure 2101. By directing the light beams 2115 through the apertures in the basal plane structure 2101, the light beams 2115 will intersect in the apertures in the basal plane structure 2101 such that nodes of the struts 2117 are formed within the apertures in the basal plane structure 2101. Additionally, although in the illustrated embodiment, the mask 2107 used during the task of forming the second region or layer 2118 of the microlattice structure 2100 is the same as the mask 2107 used during the task of forming the first layer or region 2112 of the microlattice structure 2100, in one or more alternate embodiments, the mask 2107 used during the task of forming the second region or layer 2118 of the microlattice structure 2100 may be different than the mask 2107 used during the task of forming the first region or layer 2112 of the microlattice structure 2100 depending on the desired configuration (e.g., cross-sectional shape and size) of the polymer optical waveguides 2117 in the second region or layer 2118 of the microlattice structure 2100.

The above-described tasks of irradiating the liquid photo-monomer 2103 in the reservoir 2102 with a plurality of light beams 2109 to form a first layer or region 2112 of the microlattice structure 2100, coupling a basal plane structure 2101 to an upper end 2113 of the first layer or region 2112 of the microlattice structure 2100, filling the reservoir 2102 with a volume of liquid photo-monomer 2114 to submerge the first layer 2112 and the basal plane structure 2101, and irradiating the volume of photo-monomer 2114 with a plurality of light beams 2115 to form a second layer or region 2118 of the microlattice structure 2100 above the basal plane structure 2100 may be repeated any suitable number of times to achieve a microlattice structure 2100 having a desired number of layers and a desired thickness suitable for the intended application of the microlattice structure 2100 and the desired compressive strength and stiffness of the microlattice structure 2100.

While this invention has been described in detail with particular references to exemplary embodiments thereof, the exemplary embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims. Although relative terms such as "outer," "inner," "upper," "lower," "below," "above," "vertical," "horizontal," and similar terms have been used herein to describe a spatial relationship of one element to another, it is understood that these terms are intended to encompass different orientations of the various elements and components of the invention in addition to the orientation depicted in the figures. Additionally, as used herein, the term "substantially," "about," and similar terms are used as terms of approximation and not as terms of degree, and are intended to account for the inherent deviations in measured or calculated values that would be recognized by those of ordinary skill in the art. Moreover, the tasks described above may be performed in the order described or in any other suitable sequence. Additionally, the methods described above are not limited to the tasks described. Instead, for each embodiment, one or more of the tasks described above may be absent and/or additional tasks may be performed. Furthermore, as used herein, when a component is referred to as being "on" another component, it can be directly on the other component or components may also be present therebetween. Moreover, when a component is component is referred to as being "coupled" to another component, it can be directly attached to the other component or intervening components may be present therebetween.

What is claimed is:

1. A three-dimensional microlattice structure, comprising:
    a plurality of interconnected struts extending along at least three different directions;
    a plurality of intermediate nodes defined at intersections between the plurality of struts; and
    a basal plane structure extending laterally between and interconnecting at least two of the intermediate nodes, wherein the basal plane structure is between upper and lower ends of the plurality of interconnected struts, the basal plane structure defining a plurality of apertures, each aperture of the plurality of apertures receiving one intermediate node of the plurality of intermediate nodes or one strut of the plurality of interconnected struts.

2. The three-dimensional microlattice structure of claim 1, wherein the plurality of interconnected struts at the basal plane structure define an acute angle relative to a plane of the basal plane structure.

3. The three-dimensional microlattice structure of claim 1, wherein the struts comprise polymer optical waveguides.

4. The three-dimensional microlattice structure of claim 1, wherein the basal plane structure has a non-uniform thickness.

5. The three-dimensional microlattice structure of claim 1, wherein the interconnected struts are arranged into an array of ordered unit cells.

6. The three-dimensional microlattice structure of claim 1, wherein the basal plane structure comprises a material selected from the group of materials consisting of metals, metal alloys, composites, fiberglass, ceramics, natural fibers, ceramic fiber cloths, natural fiber cloths, polymeric cloths, metallic cloths, rubbers, plastics, and combinations thereof.

7. The three-dimensional microlattice structure of claim 1, further comprising a second basal plane structure coupled to an outermost end of the interconnected struts.

8. The three-dimensional microlattice structure of claim 1, wherein the spacing between adjacent nodes varies across the three-dimensional microlattice structure.

9. A three-dimensional microlattice structure, comprising:
    a plurality of interconnected struts extending along at least three different directions, wherein the struts comprise hollow tubes;
    a plurality of intermediate nodes defined at intersections between the plurality of struts; and
    a basal plane structure extending laterally between and interconnecting at least two of the intermediate nodes.

10. The three-dimensional microlattice structure of claim 9, wherein the basal plane structure is selected from the group of structures consisting of a flat, solid plate, a flat plate defining a plurality of apertures, a flat plate having a plurality of collars, a plurality of interconnected members arranged in a grid-like pattern, a mesh, a plurality of individual members, and combinations thereof.

11. A method of manufacturing a three-dimensional microlattice, the method comprising:
    disposing a basal plane structure at a height within a volume of liquid photo-monomer between upper and lower ends of the volume of liquid photo-monomer; and
    irradiating the volume of photo-monomer with a plurality of collimated light beams to form the three-dimensional microlattice having a plurality of interconnected polymer optical waveguides and the basal plane structure between upper and lower ends of the plurality of interconnected polymer optical waveguides.

12. The method of claim 11, wherein the height of the basal plane structure corresponds to a height of a plurality of nodes defined at intersections of the polymer optical waveguides.

13. The method of claim 11, wherein the basal plane structure is selected from the group of basal plane structures consisting of a flat, solid plate, a flat plate defining a plurality of apertures, a flat plate having a plurality of collars, a plurality of interconnected basal plane members arranged in a grid-like pattern, a mesh, a plurality of individual basal plane members, and combinations thereof.

14. The method of claim 11, wherein the basal plane structure comprises a material selected from the group of materials consisting of metals, metal alloys, composites, fiberglass, ceramics, natural fibers, ceramic fiber cloths, natural fiber cloths, polymeric cloths, metallic cloths, rubbers, plastics, and combinations thereof.

15. A method of manufacturing a three-dimensional microlattice, the method comprising:
   disposing a basal plane structure at a height within a volume of liquid photo-monomer; and
   irradiating the volume of photo-monomer with a plurality of collimated light beams to form the three-dimensional microlattice having a plurality of interconnected polymer optical waveguides, wherein:
   the basal plane structure comprises a material translucent to wavelengths of the collimated light beams; and
   the irradiating of the volume of photo-monomer comprises directing a plurality of the collimated light beams through the basal plane structure such that the polymer optical waveguides form on opposite sides of the basal plane structure.

16. A method of manufacturing a three-dimensional microlattice, the method comprising:
   disposing a basal plane structure at a height within a volume of liquid photo-monomer; and
   irradiating the volume of photo-monomer with a plurality of collimated light beams to form the three-dimensional microlattice having a plurality of interconnected polymer optical waveguides, wherein:
   the basal plane structure comprises a flat plate defining a plurality of apertures; and
   the irradiating of the volume of photo-monomer comprises directing a plurality of the collimated light beams through the apertures in the basal plane structure.

17. A method of manufacturing a three-dimensional microlattice, the method comprising:
   disposing a basal plane structure at a height within a volume of liquid photo-monomer;
   irradiating the volume of photo-monomer with a plurality of collimated light beams to form the three-dimensional microlattice having a plurality of interconnected polymer optical waveguides;
   coating the polymer optical waveguides with a dissimilar material by a process selected from the group of processes consisting of electrodeposition, electroplating, vapor deposition, spray coating, dip coating, and combinations thereof; and
   selectively removing the polymer optical waveguides to form a plurality of interconnected hollow tubular struts.

18. A method of manufacturing a three-dimensional microlattice, the method comprising:
   positioning a substrate against an upper surface of a volume of photo-monomer contained in a reservoir;
   irradiating the volume of photo-monomer with a first plurality of collimated light beams to form a first layer of the three-dimensional microlattice having a first plurality of interconnected polymer optical waveguides adhered to the substrate;
   actuating a moveable platform coupled to the substrate to lift the first layer of the three-dimensional microlattice out of a remaining volume of photo-monomer;
   coupling a basal plane structure to a lower end of the first layer of the three-dimensional microlattice; and
   irradiating the remaining volume of photo-monomer with a second plurality of collimated light beams to form a second layer of the three-dimensional microlattice having a second plurality of interconnected waveguides adhered to the basal plane structure.

19. The method of claim 18, further comprising adding or removing a volume of photo-monomer to the reservoir after irradiating the volume of photo-monomer with a plurality of collimated light beams to form the first layer of the three-dimensional microlattice.

20. The method of claim 18, wherein the basal plane structure is selected from the group of basal plane structures consisting of a flat, solid plate, a flat plate defining a plurality of apertures, a flat plate having a plurality of collars, a plurality of interconnected basal plane members arranged in a grid-like pattern, a mesh, a plurality of individual basal plane members, and combinations thereof.

21. The method of claim 18, further comprising orienting the second plurality of collimated light beams such that the orientation of the second plurality of collimated light beams differs from the orientation of the first plurality of collimated light beams.

22. The method of claim 18, further comprising:
   directing the first plurality of collimated light beams through a plurality of apertures defined by a first mask;
   replacing the first mask with a second mask defining a plurality of apertures differing in at least one of size, shape, and spacing from the apertures defined by the first mask; and
   directing the second plurality of collimated light beams through the plurality of apertures defined by the second mask such that the waveguides in the first and second layers of the microlattice differ in at least one of size, cross-sectional shape, and spacing.

23. The method of claim 18, further comprising coating the first and second plurality of polymer optical waveguides with a dissimilar material by a process selected from the group of processes consisting of electrodeposition, electroplating, vapor deposition, spray coating, dip coating, and combinations thereof.

24. The method of claim 23, further comprising selectively removing the first and second plurality of polymer optical waveguides to form a plurality of interconnected hollow tubular struts.

* * * * *